(12) United States Patent
Kasuya

(10) Patent No.: US 9,596,377 B2
(45) Date of Patent: Mar. 14, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kenji Kasuya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/964,259

(22) Filed: Dec. 9, 2015

(65) Prior Publication Data

US 2016/0173728 A1  Jun. 16, 2016

(30) Foreign Application Priority Data

Dec. 11, 2014 (JP) ................. 2014-250976

(51) Int. Cl.
   *G06F 15/00* (2006.01)
   *H04N 1/333* (2006.01)
   *H04N 1/32* (2006.01)

(52) U.S. Cl.
   CPC ..... *H04N 1/33376* (2013.01); *H04N 1/32496* (2013.01)

(58) Field of Classification Search
   CPC ..................... H04N 1/4406; H04N 2201/0094
   USPC ................................................ 358/1.13–1.15
   See application file for complete search history.

(56) References Cited

U.S. PATENT DOCUMENTS

2013/0335774 A1* 12/2013 Kato ..................... G06F 3/1296
                                                    358/1.15

FOREIGN PATENT DOCUMENTS

JP        H07288625 A      10/1995

* cited by examiner

*Primary Examiner* — Saeid Ebrahimi Dehkord
(74) *Attorney, Agent, or Firm* — Canon U.S.A., Inc. IP Division

(57) ABSTRACT

An image processing apparatus for reading a document to generate image data using a reading unit performs, receiving a job including a document reading-and-transmission job for causing the reading unit to read a document to generate image data and then transmitting the image data to a specified destination, from an information processing apparatus communicable via a network, storing the received job, displaying a list of the stored jobs in response to a user instruction, displaying a confirmation screen related to transmission setting contents of a document reading-and-transmission job selected from the list of jobs, and executing, in a case where execution of the selected document reading-and-transmission job is instructed via the confirmation screen, the document reading-and-transmission job.

11 Claims, 25 Drawing Sheets

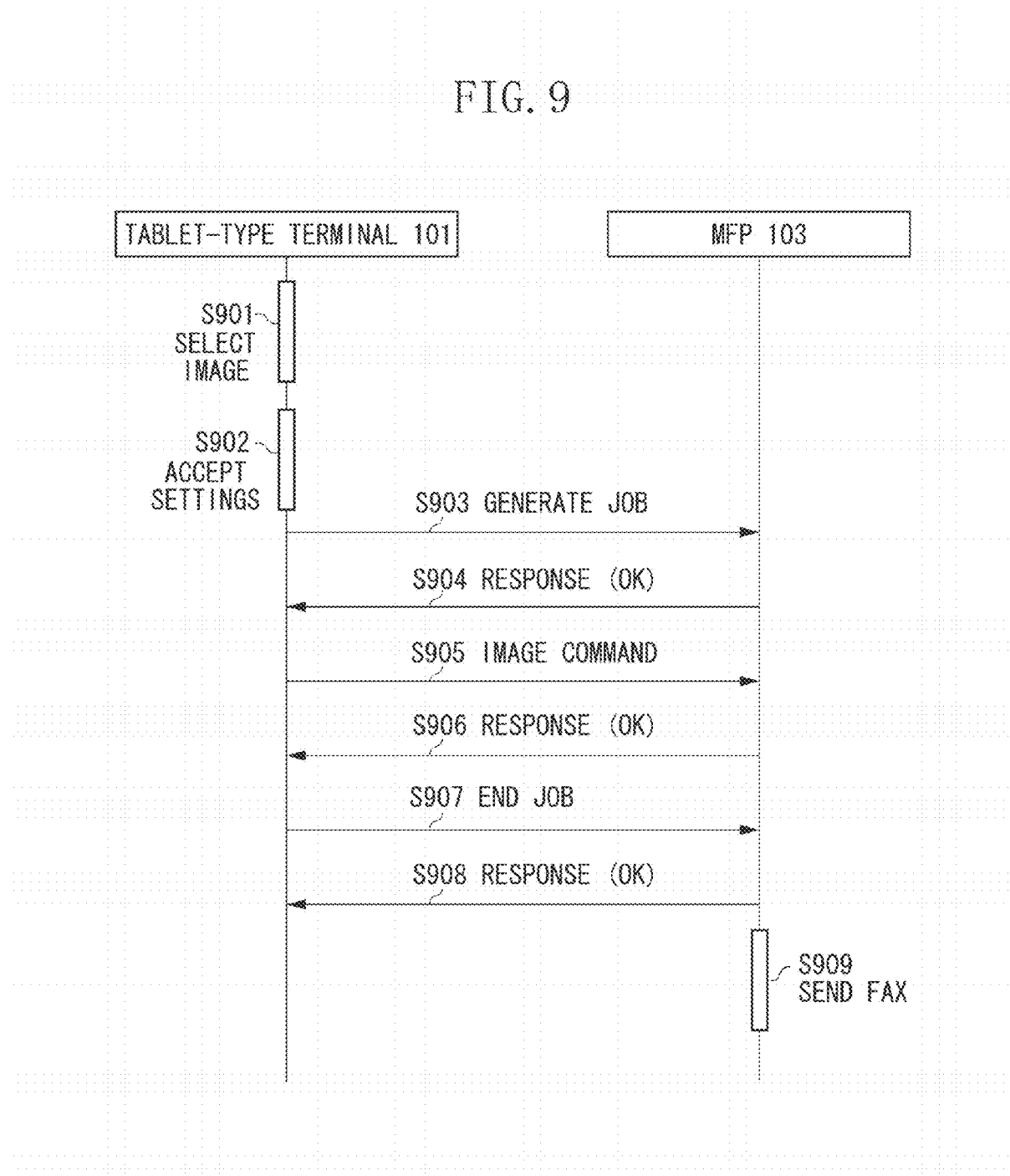

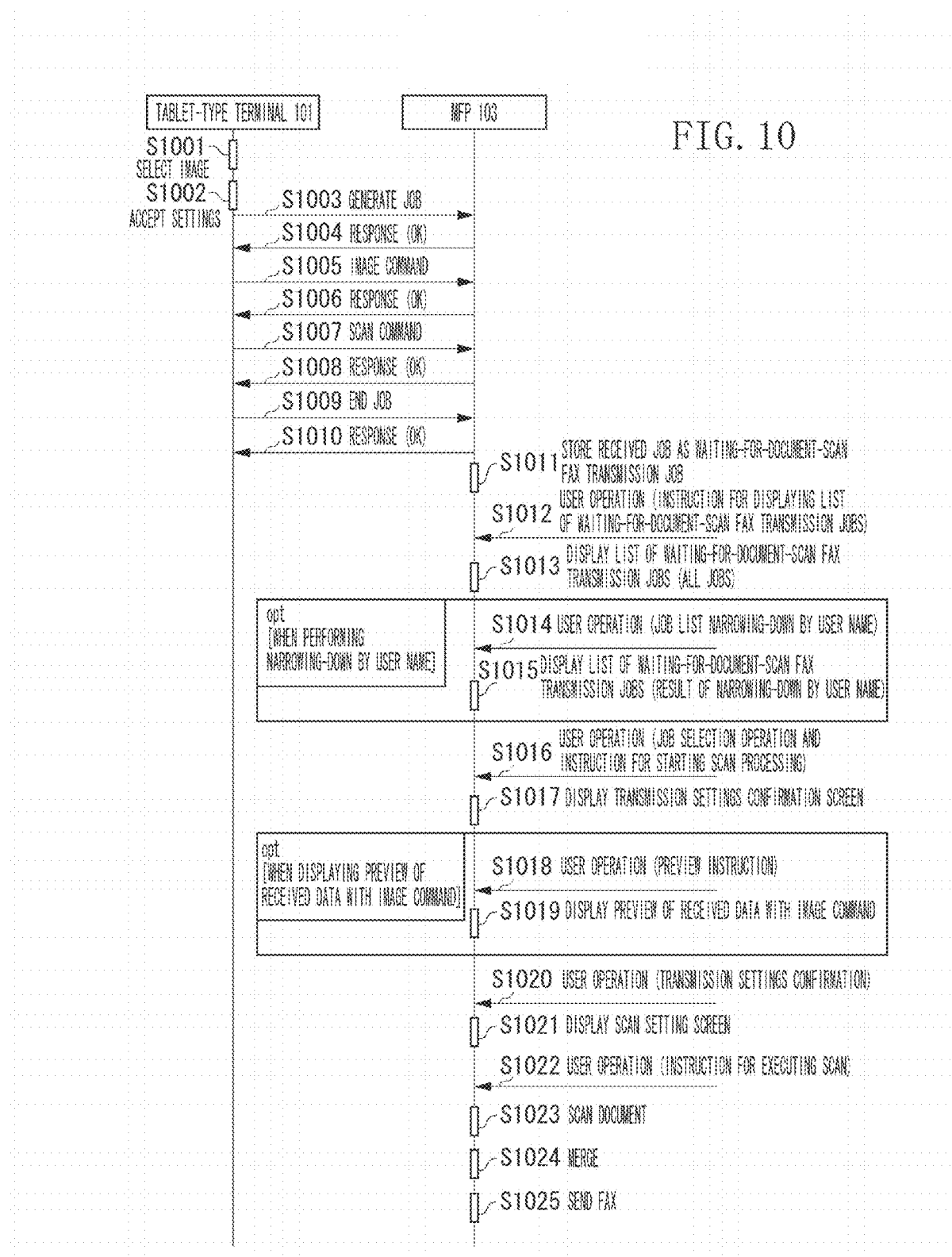

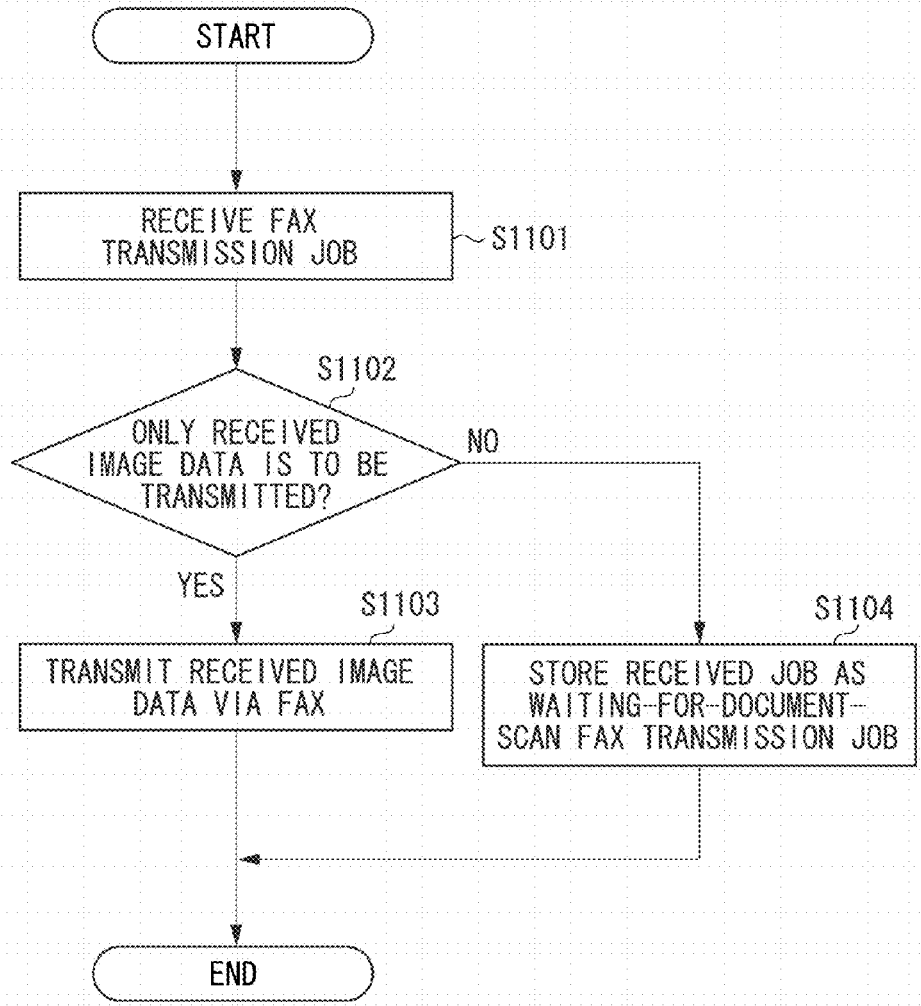

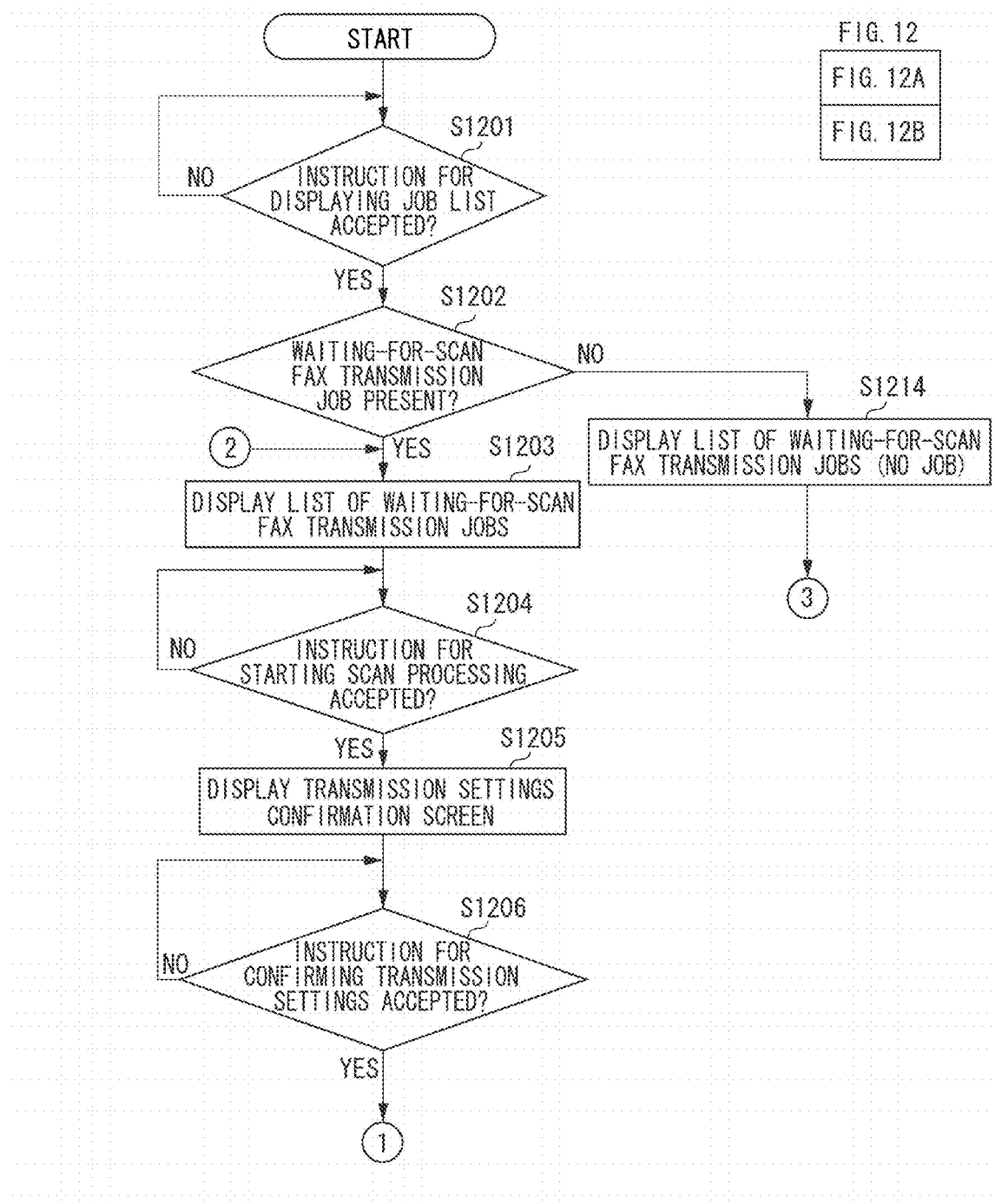

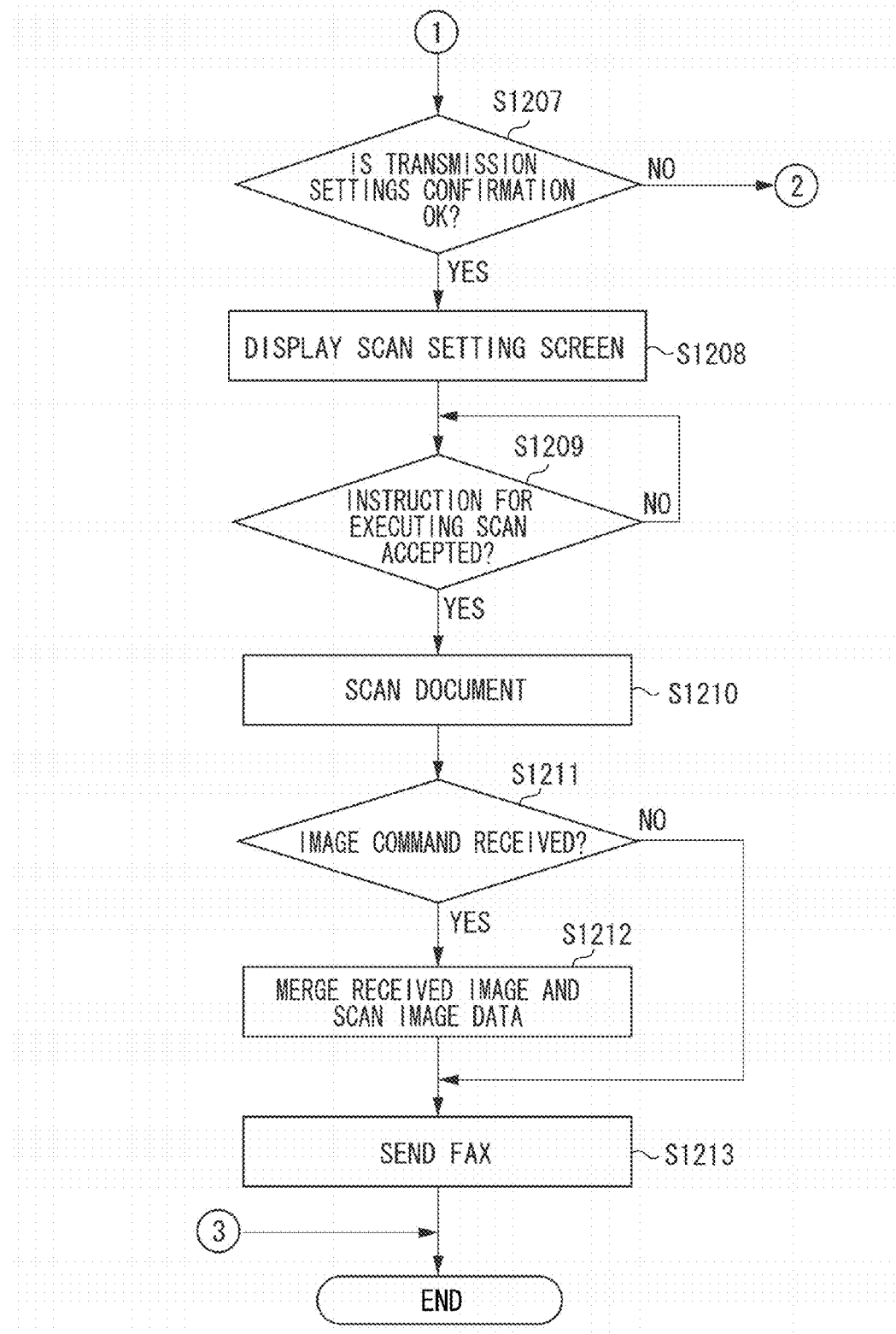

FIG. 13

| FIG. 13A |
|----------|
| FIG. 13B |
| FIG. 13C | FIG. 13D |
| FIG. 13E | FIG. 13F |

FIG. 13A

WAITING-FOR-SCAN FAX TRANSMISSION JOBS

- SELECT USER — ALL USERS — ◄—1301

| 0001 | 10:06 | USER 1 | | 0387654321 |
| 0002 | 10:06 | USER 2 | | 0612345678 |
| 0003 | 10:07 | USER 1 | | MULTI-ADDRESS TRANSMISSION |

1/1

DETAILED INFORMATION ►

DESELECT | CANCEL | READ SETTING —1302

CLOSE

↓ INSTRUCTION FOR NARROWING-DOWN BY USER NAME

FIG. 13B

WAITING-FOR-SCAN FAX TRANSMISSION JOBS

- SELECT USER — USER 1 — ►

| ✓ 0001 | 10:06 | USER 1 | | 0312345678 |
| 0003 | 10:07 | USER 1 | | MULTI-ADDRESS TRANSMISSION |

1/1

DETAILED INFORMATION ►

DESELECT | CANCEL | READ SETTING —1302

CLOSE

↓ INSTRUCTION FOR READ SETTING

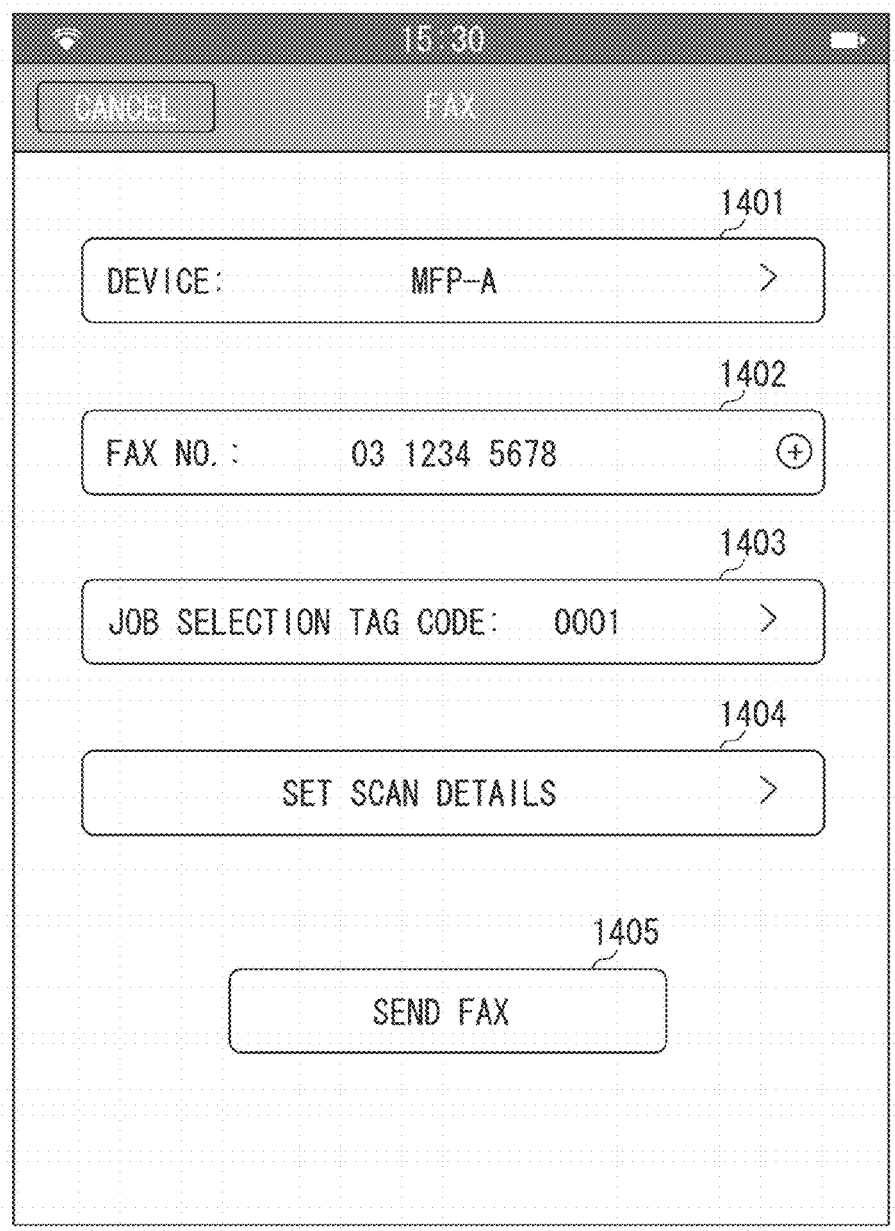

FIG. 19
| FIG. 19A | FIG. 19B |
| FIG. 19C | |
| FIG. 19D | FIG. 19E |
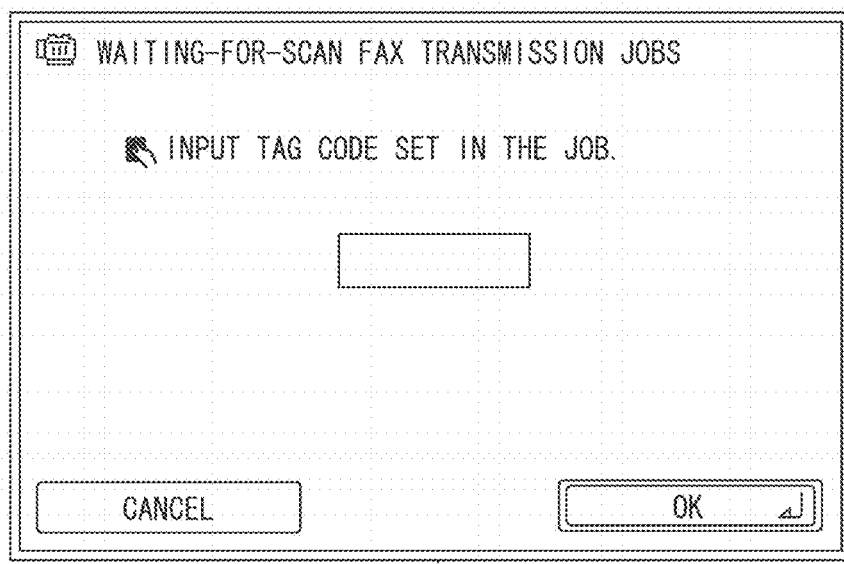
FIG. 19A
WHEN THERE IS NO WAITING-FOR-SCAN FAX TRANSMISSION JOB HAVING TAG CODE MATCHING INPUT TAG CODE
OK BUTTON PRESSED
WHEN THERE IS A WAITING-FOR-SCAN FAX TRANSMISSION JOB HAVING TAG CODE MATCHING INPUT TAG CODE
FIG. 19C
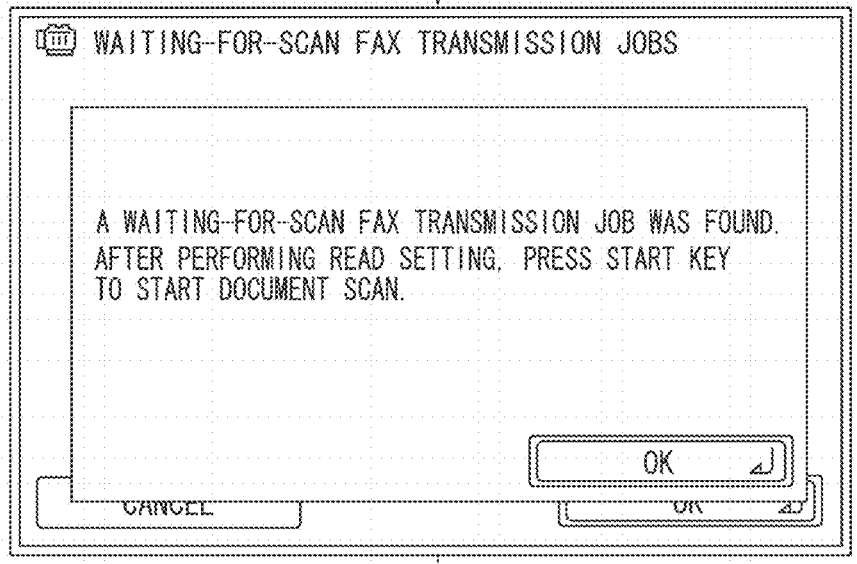
OK BUTTON PRESSED

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

Conventionally, there has been a known function of transmitting image data generated on a client computer to a facsimile (fax) machine via a local area network (LAN) and executing a fax transmission from the fax machine. In this case, a fax transmission destination can be specified by a user on the client computer.

There has also been a known function of notifying the fax machine only of a destination specified by the user and transmitting, via fax, image data generated by reading a document on the fax machine to the specified destination, without preparing image data on the client computer (Japanese Patent Application Laid-Open No. 7-288625).

However, in the technique discussed in Japanese Patent Application Laid-Open No. 7-288625, when a scanner unit of the fax machine is in use or when the fax machine is executing a document reading-and-transmission job according to an instruction from another client computer, the fax machine does not receive a new document reading-and-transmission job. More specifically, in the technique discussed in Japanese Patent Application Laid-Open No. 7-288625, there has been a problem of user-unfriendliness because whether a new document reading-and-transmission job is executable is determined by a use state of the fax machine by another user.

Further, in the technique discussed in Japanese Patent Application Laid-Open No. 7-288625, when the fax machine almost simultaneously receives document reading-and-transmission jobs from different client computers, the fax machine transmits image data generated by reading a document to the destination specified by the job received first. Therefore, the image data may be transmitted to a destination not intended by the user, i.e., a destination specified by a document reading-and-transmission job input by another client computer, causing a security problem.

SUMMARY OF THE INVENTION

The present invention is directed to a mechanism for reliably executing a document reading-and-transmission job regardless of use states of an image processing apparatus by other users even in a case where a plurality of users uses the image processing apparatus on a shared basis.

According to an aspect of the present invention, an image processing apparatus for reading a document to generate image data using a reading unit includes, a receiving unit configured to receive a job including a document reading-and-transmission job for causing the reading unit to read a document to generate image data and then transmitting the image data to a specified destination, from an information processing apparatus communicable via a network, a storage unit configured to store the job received by the receiving unit, a job list display unit configured to display a list of jobs stored by the storage unit in response to a user instruction, a confirmation screen display unit configured to display a confirmation screen related to transmission setting contents of a document reading-and-transmission job selected from the job list displayed by the job list display unit, and an execution unit configured to execute the document reading-and-transmission job in a case where execution of the selected document reading-and-transmission job is instructed via the confirmation screen displayed by the confirmation screen display unit.

Further features of the present invention will become apparent from the following description of exemplary embodiments with reference to the attached drawings.

BRIEF DESCRIPTION OF THE DRAWINGS

FIG. 9 is a sequence diagram (2) illustrating an example of processing of the image processing system.

FIG. 10 is a sequence diagram (3) illustrating an example of processing of the image processing system.

FIG. 11 is a flowchart (1) illustrating an example of processing of the MFP.

FIG. 12, consisting of 12A and 12B, is a flowchart (2) illustrating an example of processing of the MFP.

FIG. 14 is a diagram illustrating an example of an operation screen (4) of the tablet-type terminal.

DESCRIPTION OF THE EMBODIMENTS

Exemplary embodiments of the present invention will be described below with reference to the accompanying drawings. The following exemplary embodiments are not intended to limit the scope of the appended claims. Not all of the combinations of the features described in the exemplary embodiments are necessarily indispensable to the solutions according to the present invention.

Figure 1:
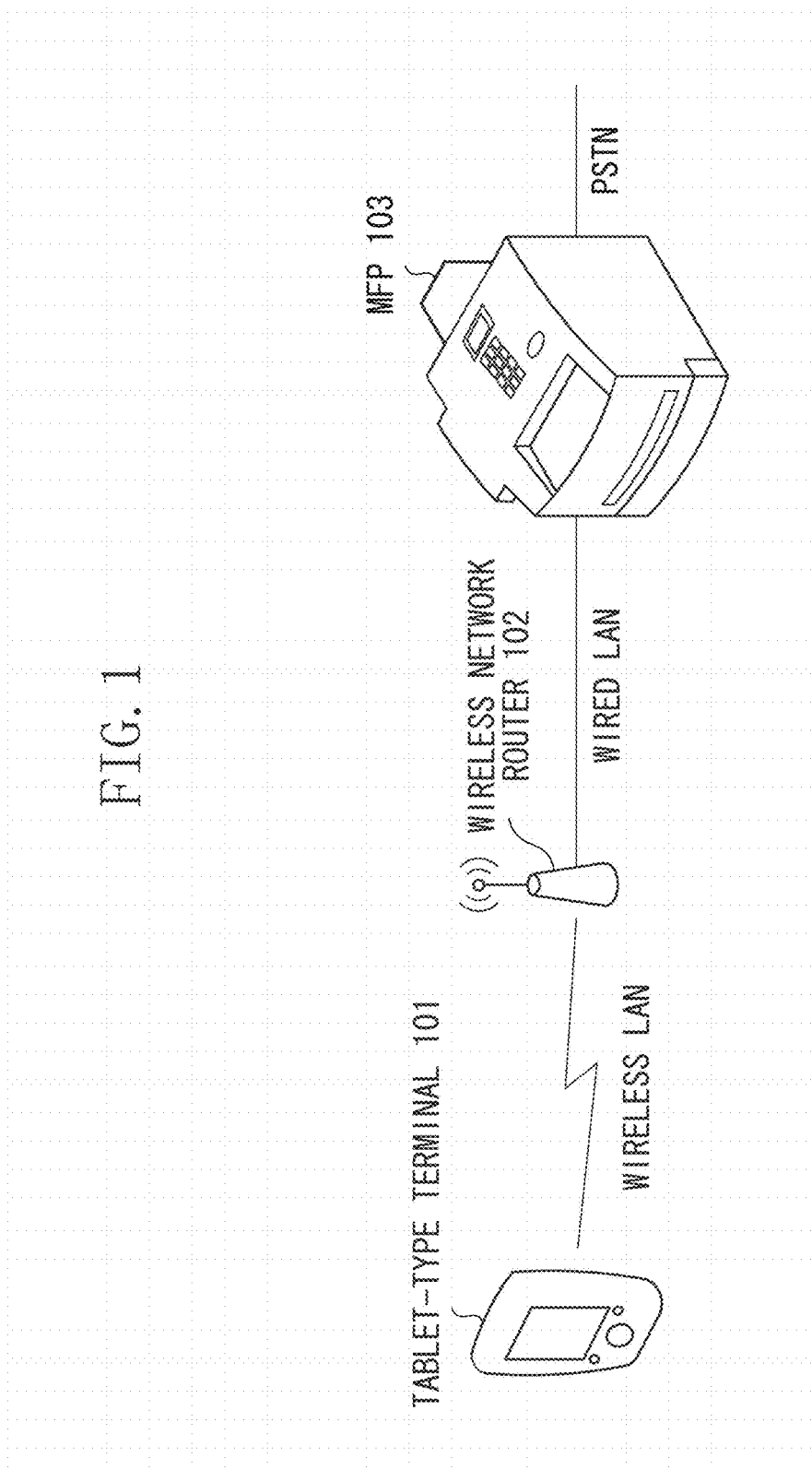
FIG. 1 is a diagram illustrating an example of a system configuration of an image processing system.

A first exemplary embodiment of the present invention will be described below. FIG. 1 is a diagram illustrating an example of a system configuration of an image processing system according to the present exemplary embodiment. A tablet-type terminal 101 as an example of an information processing apparatus communicates with a multifunction peripheral (MFP) 103 via a wireless network router (wireless access point) 102. The MFP 103 is an example of an image processing apparatus. The tablet-type terminal 101 and the wireless network router 102 are connected with each other via a wireless LAN (local area network). The MFP 103 and the wireless network router 102 are connected with each other via a wired LAN. The MFP 103 is also connected to a Public Switched Telephone Network (PSTN). The communication path between the tablet-type terminal 101 and the MFP 103 is not limited to that described above. For example, the tablet-type terminal 101 and the wireless network router 102 may be connected with each other via a wired LAN. The MFP 103 and the wireless network router 102 may be connected with each other via a wireless LAN. Further, the tablet-type terminal 101 and the MFP 103 may be connected to an identical network. In other words, the tablet-type terminal 101 and the MFP 103 may be configured in any form as long as they can communicate with each other via a network.

Figure 2:
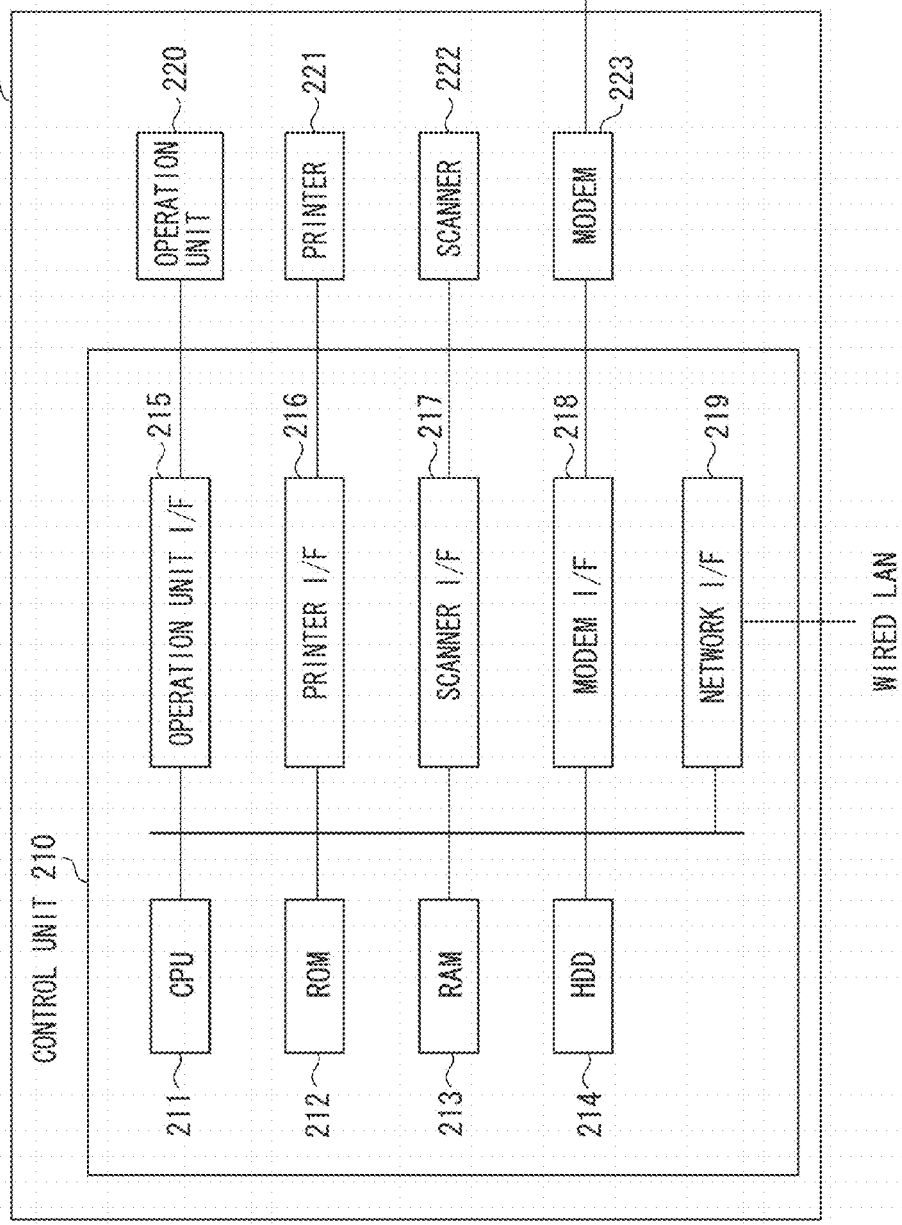
FIG. 2 is a diagram illustrating an example of a hardware configuration of a multifunction peripheral (MFP).

FIG. 2 is a diagram illustrating an example of a hardware configuration of the MFP 103. A control unit 210 including a central processing unit (CPU) 211 controls operations of the entire MFP 103. The CPU 211 reads a control program stored in a read only memory (ROM) 212 and controls various operations, such as reading, printing, and communication. More specifically, the CPU 211 implements the software configuration of the MFP 103, and processing of the MFP 103 illustrated in sequence diagrams and flowcharts (described below) by reading and executing a program stored in the ROM 212.

A random access memory (RAM) 213 is used as a main memory for the CPU 211 and a temporary storage area such as a work area. Although, in the MFP 103, the CPU 211 performs processing illustrated in the flowcharts (described below) using one memory (the RAM 213 or a hard disk drive (HDD) 214), other configurations may be used. For example, processing illustrated in the flowcharts may be implemented by operating a plurality of CPUs and a plurality of RAMS or HDDs in a collaborative way.

The HDD 214 stores image data and various programs. The HDD 214 is also used as a storage area for storing various setting data of the MFP 103. An operation unit interface (I/F) 215 connects the operation unit 220 and the control unit 210. The operation unit 220 is provided with a liquid crystal display (LCD) unit having touch-panel functions, and a keyboard, and serves as an accepting unit for accepting operations, inputs, and instructions by the user.

A printer I/F 216 connects a printer 221 and the control unit 210. Image data to be printed by the printer 221 is transferred from the control unit 210 via the printer I/F 216, and is printed on a recording medium by the printer 221.

A scanner I/F 217 connects a scanner 222 and the control unit 210. The scanner 222 reads a document, generates image data, and inputs the image data to the control unit 210 via the scanner I/F 217.

A modem I/F 218 connects a modem 223 and the control unit 210. The modem 223 is connected to a PSTN and transmits and receives image data to and from an external fax machine (not illustrated) via fax communication. A network I/F 219 connects the control unit 210 (MFP 103) to a wired LAN. The MFP 103 communicates with an external apparatus via the network I/F 219 to enable transmitting and receiving image data and various kinds of information to and from the external apparatus.

Figure 3:
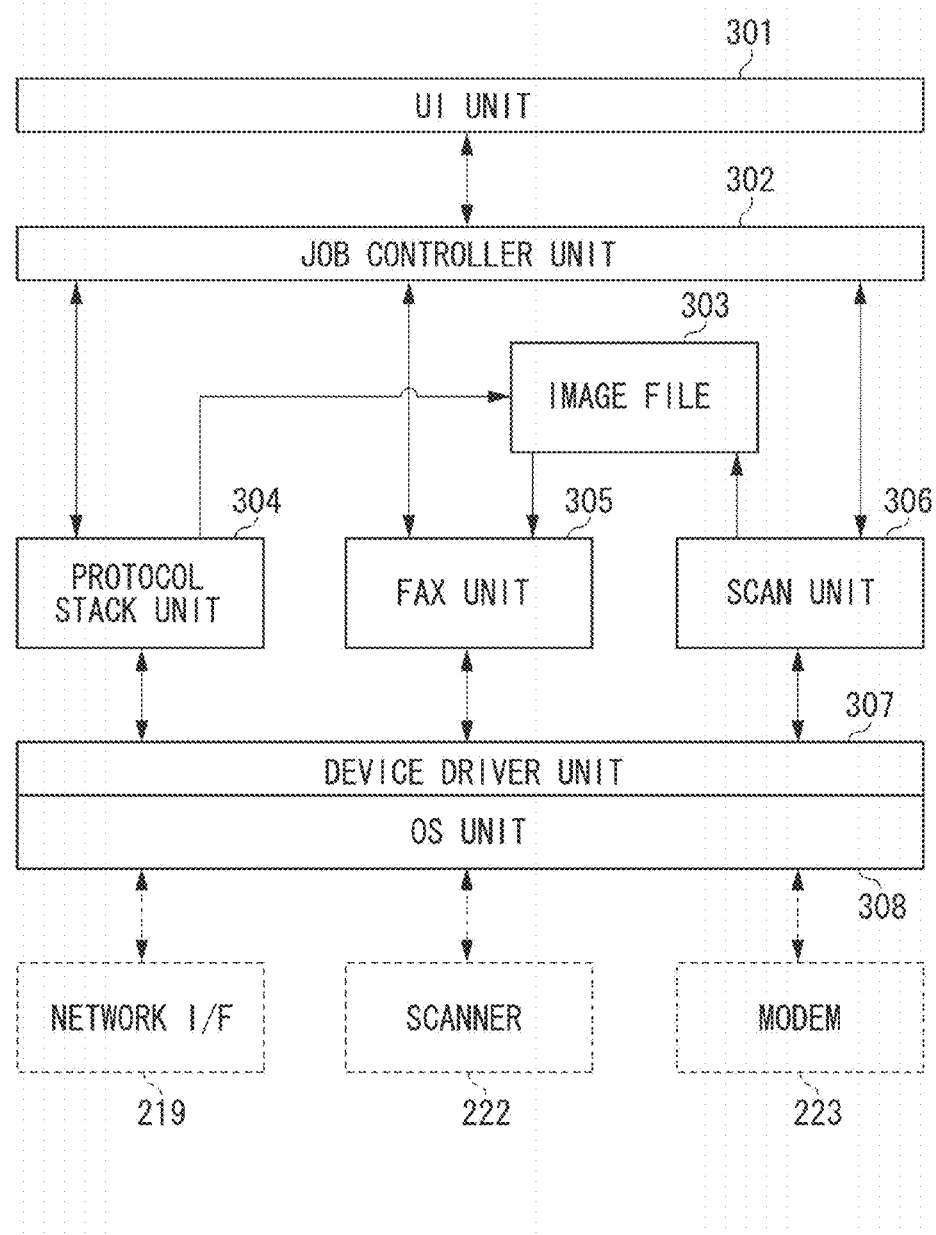
FIG. 3 is a diagram illustrating an example of a software configuration of the MFP.

FIG. 3 is a diagram illustrating an example of a software configuration of the MFP 103. Referring to FIG. 3, each unit drawn by solid lines is a software module implemented when the CPU 211 reads and executes a program stored in the ROM 212 or the HDD 214. A user interface (UI) unit 301 provides the user with various kinds of information via the operation unit 220 and accepts various instructions from the user. A job controller unit 302 receives a job such as a copy job, a print job, and a fax job, and controls execution of the received job. A protocol stack unit 304 stores various network protocols such as Transmission Control Protocol/Internet Protocol (TCP/IP) and Hypertext Transfer Protocol (HTTP).

In the present exemplary embodiment, image data transmitted from the tablet-type terminal 101 is received via the network I/F 219 according to a network protocol stored in the protocol stack unit 304. The received image data is stored in an image file unit 303. The image file unit 303 is a software module for managing image data stored in the RAM 213 or the HDD 214.

The image file unit 303 stores not only image data received via the network I/F 219 but also image data generated by the scanner 222. The image data generation by the scanner 222 is controlled by a Scan unit 306. A fax unit 305 controls fax communication via the modem 223. When transmitting via fax the image data from the MFP 103, the fax unit 305 reads and transmits image data stored in the image file unit 303.

An Operating System (OS) unit 308 adjusts each of the modules and tasks to manage the entire software of the MFP 103. A device driver unit 307 is combined with the OS unit 308. The device driver unit 307 controls hardware devices such as the scanner 222 and the modem 223.

Figure 4:
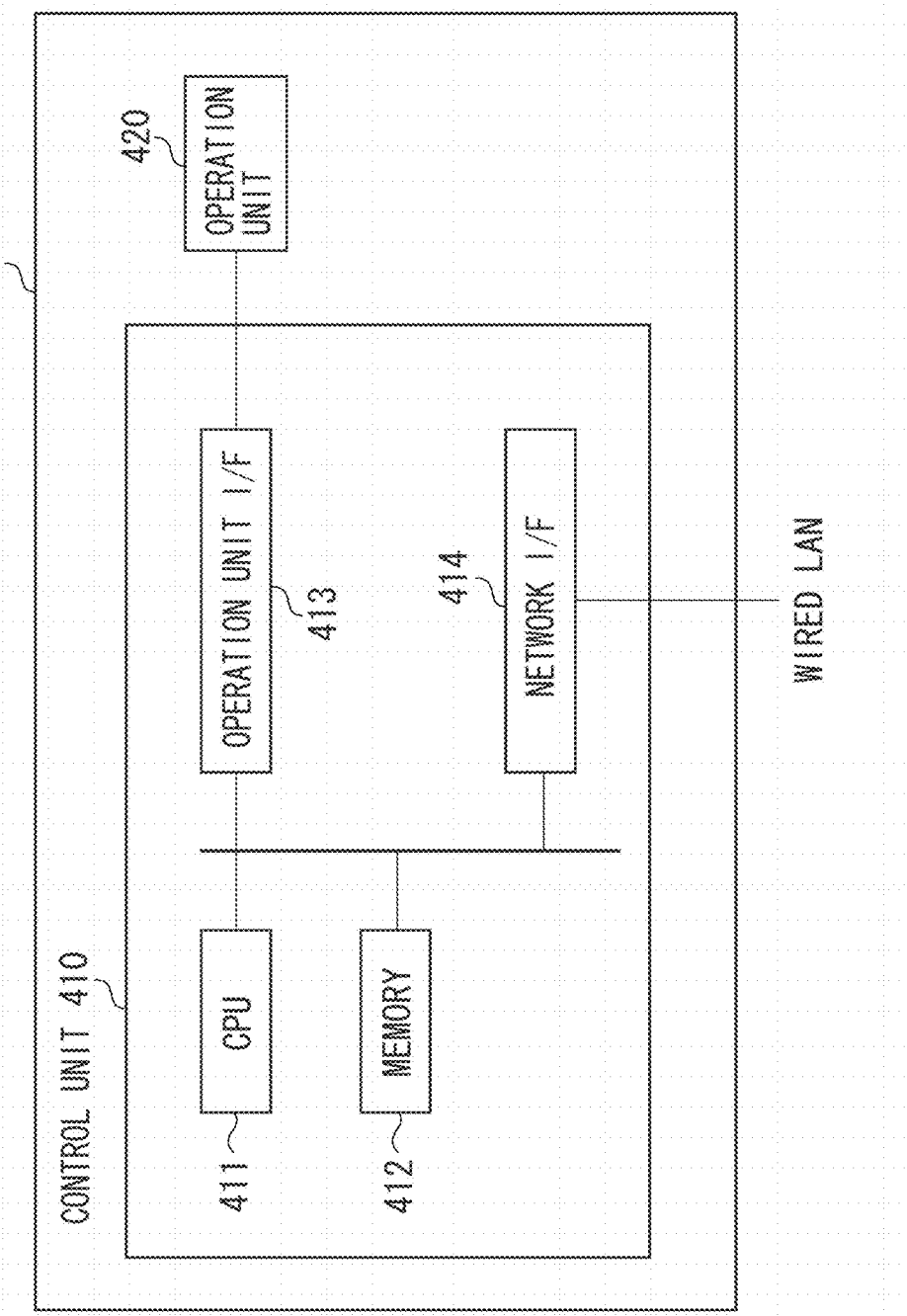
FIG. 4 is a diagram illustrating an example of a hardware configuration of a tablet-type terminal.

FIG. 4 is a diagram illustrating an example of a hardware configuration of the tablet-type terminal 101. A control unit 410 including a CPU 411 controls operations of the entire tablet-type terminal 101. The CPU 411 reads a control program stored in a memory 412 to perform various control operations. More specifically, the CPU 411 implements functions of the tablet-type terminal 101 and processing of the tablet-type terminal 101 in sequence diagrams (described below) by reading and executing a program stored in the memory 412. The memory 412 is also used as a main memory for the CPU 411 and a temporary storage area such as a work area. Although the tablet-type terminal 101 performs processing via one CPU 411 by using one memory 412, other configurations may be used. For example, processing may be performed by using a plurality of CPUs and a plurality of memories in a collaborative way.

An operation unit I/F 413 connects the operation unit 420 and the control unit 410. The operation unit 420 is provided with a liquid crystal display (LCD) unit having touch-panel functions, and serves as an accepting unit for accepting operations, inputs, and instructions by the user. A network I/F 414 connects the control unit 410 (tablet-type terminal 101) to a wireless LAN. The tablet-type terminal 101 is able to transmit image data and information and receive various kinds of information to and from an external apparatus using the network I/F 414.

Figure 5:
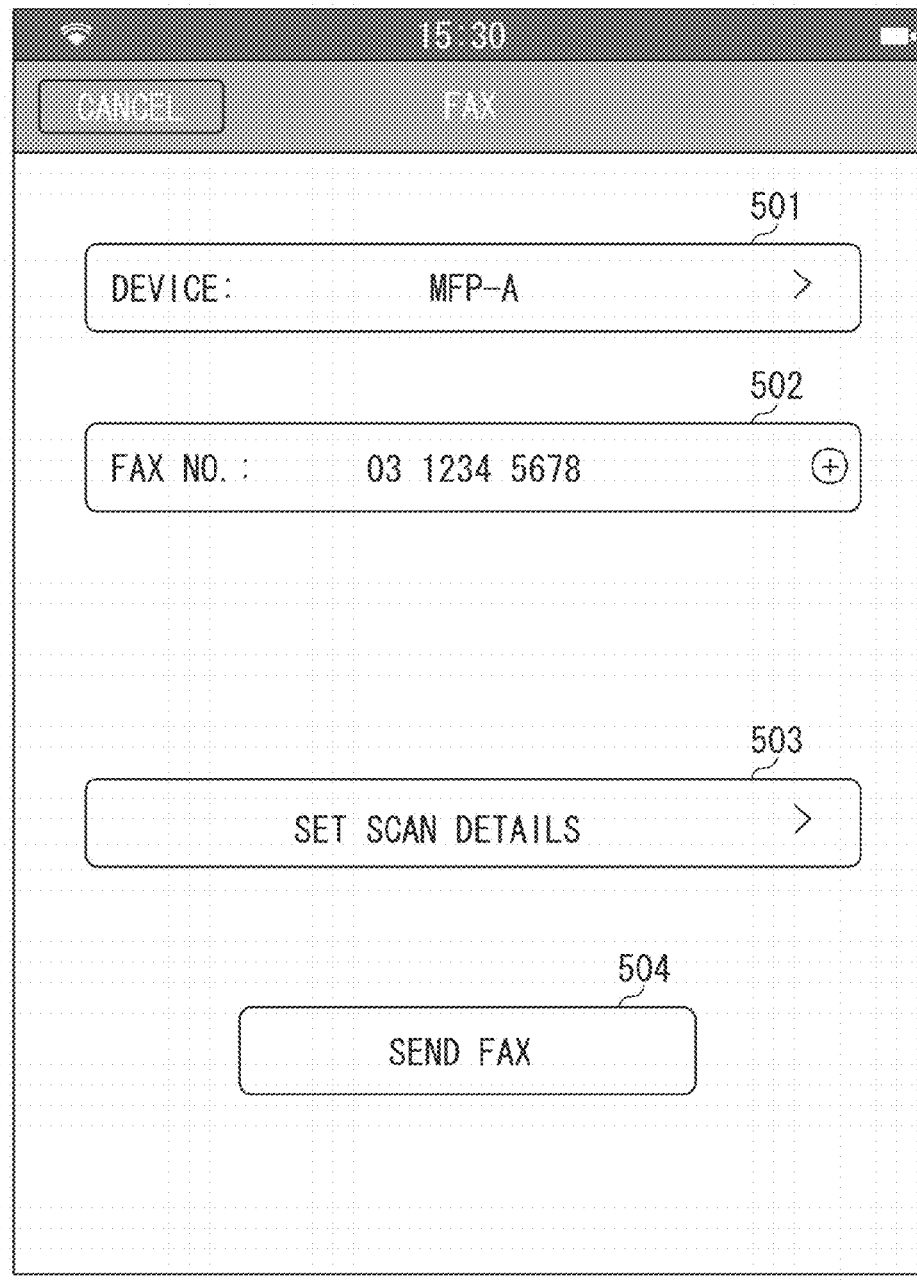
FIG. 5 is a diagram illustrating an example of an operation screen (1) of the tablet-type terminal.

FIG. 5 is a diagram illustrating an example of an operation screen of a fax transmission application displayed on the tablet-type terminal 101. The fax transmission application, i.e., an application that can be downloaded from a server on the Internet and additionally installed on the tablet-type terminal 101, is software operated on the OS unit of the tablet-type terminal 101. Using the fax transmission application enables the user of the tablet-type terminal 101 to perform setting for causing the MFP 103 to perform fax transmission. Operations of the tablet-type terminal 101

(described below) are performed based on instructions from the fax transmission application.

When the tablet-type terminal 101 activates the fax transmission application, an operation screen illustrated in FIG. 5 is displayed. A setting field 501 is used to select and set an MFP for performing fax transmission. When the user touches the setting field 501, the tablet-type terminal 101 searches for MFPs nearby and then displays a list of found MFPs. The user is able to select an MFP for performing fax transmission from among the displayed MFPs.

A setting field 502 is used to set a telephone number (fax number) to be used as a fax transmission destination. The user may input a telephone number using a software keyboard displayed on the tablet-type terminal 101, or select a telephone number by referring to an address book stored in the tablet-type terminal 101.

A setting field 503 is used to perform detailed settings on scan processing (read processing) to be performed via the scanner 222 of the MFP 103. When the user touches the setting field 503, the tablet-type terminal 101 displays a screen for specifying reading parameters such as the resolution, image quality, and document size, and accepts scan settings from the user via this screen. The user is able to change the detailed settings on scan processing set in the setting field 503, from the operation unit 220 of the MFP 103 at any time before the scan processing is started.

A send fax key 504 is used to instruct the MFP 103 to perform fax transmission. When the user presses the send fax key 504 after setting of the setting fields 501 to 503 is completed, communication between the tablet-type terminal 101 and the MFP 103 is started.

Figure 6:
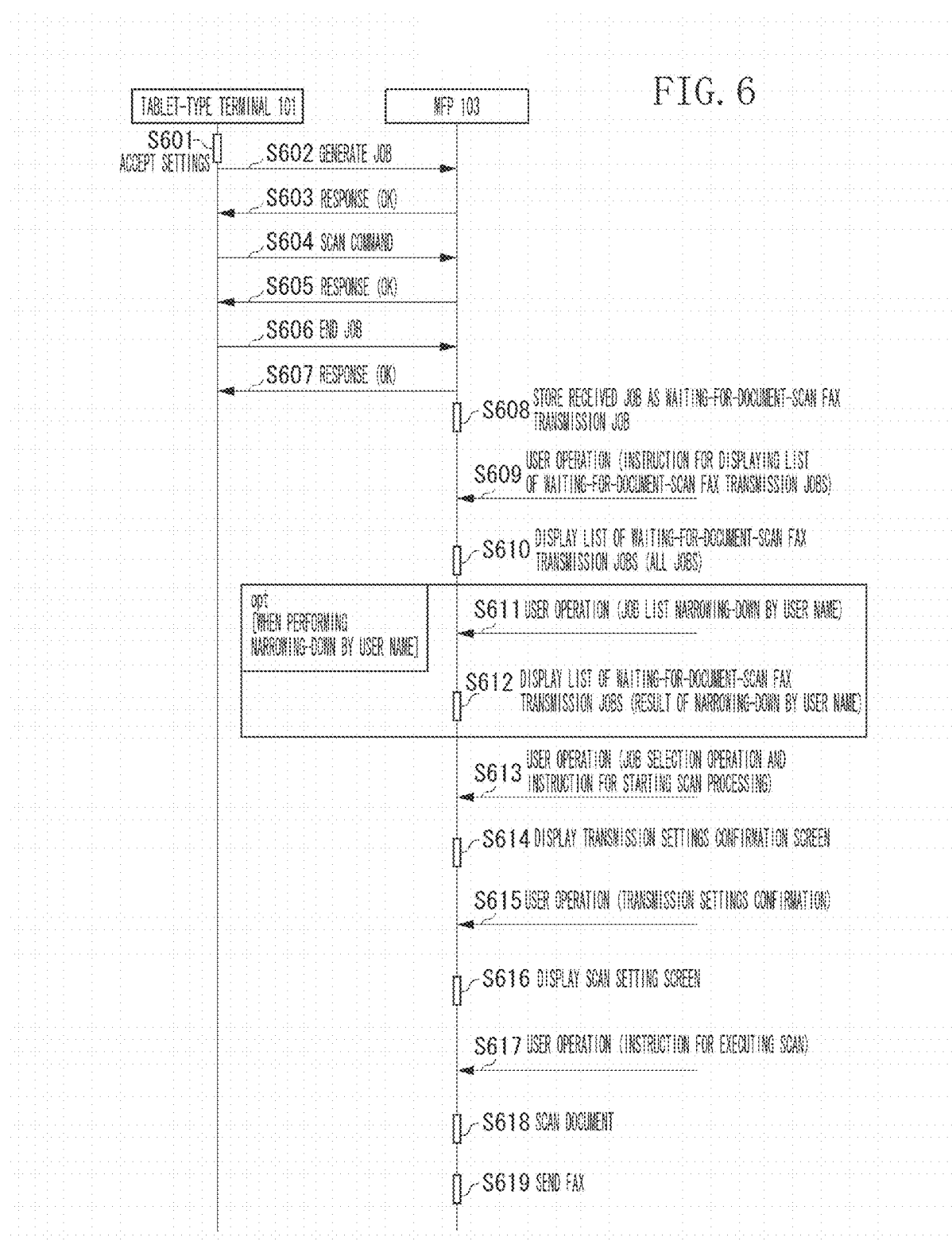
FIG. 6 is a sequence diagram (1) illustrating an example of processing of the image processing system.

FIG. 6 is a sequence diagram illustrating an example of processing performed between the tablet-type terminal 101 and the MFP 103. In step S601, the tablet-type terminal 101 accepts settings from the user via the operation screen on the tablet-type terminal 101 illustrated in FIG. 5. In step S602, the tablet-type terminal 101 transmits a command for generating a job to the MFP 103. The user name of a user who operates the tablet-type terminal 101 is to be added to the job generation command as attribute information. Upon reception of the command, then in step S603, the MFP 103 transmits a response (OK) to the tablet-type terminal 101.

In step S604, the tablet-type terminal 101 transmits a scan command for instructing the MFP 103 to perform scan processing. Upon reception of the command, then in step S605, the MFP 103 transmits a response (OK) to the tablet-type terminal 101 regardless of the use state of the scanner 222. In step S606, the tablet-type terminal 101 transmits a command for ending the job to the MFP 103. Upon reception of the command, then in step S607, the MFP 103 transmits a response (OK) to the tablet-type terminal 101. In step S608, the MFP 103 stores the received job as a waiting-for-document-scan fax transmission job. A fax transmission job containing a scan command is referred to as a document reading-and-transmission job.

In step S609, the MFP 103 waits for a user operation. When the MFP 103 accepts a user operation (instruction for displaying a list of waiting-for-document-scan fax transmission jobs), the processing proceeds to step S610. Then, in step S610, the MFP 103 displays a list (job list) of waiting-for-document-scan fax transmission jobs on the display unit of the operation unit 220 (job list display processing). As described above, the MFP 103 according to the present exemplary embodiment receives a fax transmission job containing a scan command regardless of the use state of the scanner 222. Therefore, in step S610, the MFP 103 displays a screen for displaying all of unprocessed waiting-for-document-scan fax transmission jobs which have been received until the MFP 103 accepts a user operation in step S609.

On the screen displayed in step S610, the user is also able to narrow down the job list using the user name as a key. In step S611, the MFP 103 accepts an instruction for narrowing down the job list from the user. Upon acceptance of the relevant instruction, then in step S612, the MFP 103 displays a list of waiting-for-document-scan fax transmission jobs to which the result of the narrowing-down has been reflected.

In step S613, the MFP 103 accepts a job selection operation and a read setting instruction from the user. Upon acceptance of the user instruction, then in step S614, the MFP 103 displays a screen for confirming transmission settings related to the selected job. The processing in step S614 is an example of processing for displaying the confirmation screen. The confirmation screen displayed at this timing displays at least a destination telephone number. In step S615, the MFP 103 accepts an instruction indicating that the display contents of the confirmation screen are correct from the user. Upon acceptance of the instruction, then in step S616, the MFP 103 displays a scan setting screen related to the waiting-for-document-scan fax transmission job on the display unit of the operation unit 220, and accepts a user instruction. The processing in step S616 is an example of processing for displaying the scan setting screen.

In step S617, the MFP 103 accepts an instruction for performing scan processing from the user. Upon acceptance of the instruction, then in step S618, the MFP 103 performs processing for scanning a document using the scanner 222. Although the scan processing is performed according to the setting contents set in the setting field 503 illustrated in FIG. 5, when the setting contents in the scan setting screen displayed in step S616 are changed, the scan processing will be performed according to the settings after change. In step S619, the MFP 103 transmits via fax the image data acquired through the scan processing performed in step S618. The destination of this fax transmission is the telephone number set in the setting field 502 illustrated in FIG. 5. The processing performed in steps S618 and S619 illustrated in FIG. 6 is an example of job execution processing according to an instruction accepted via the confirmation screen and the scan setting screen.

As described above, according to the setting contents set on the tablet-type terminal 101, the MFP 103 scans a document and then transmits via fax the acquired image data. Hereinafter, this processing is referred to as first transmission processing. In the first transmission processing, the MFP 103 transmits via fax only the image data acquired by scanning a document. Second transmission processing in which the MFP 103 transmits via fax the image data prepared on the tablet-type terminal 101 will be described below.

Figure 7:
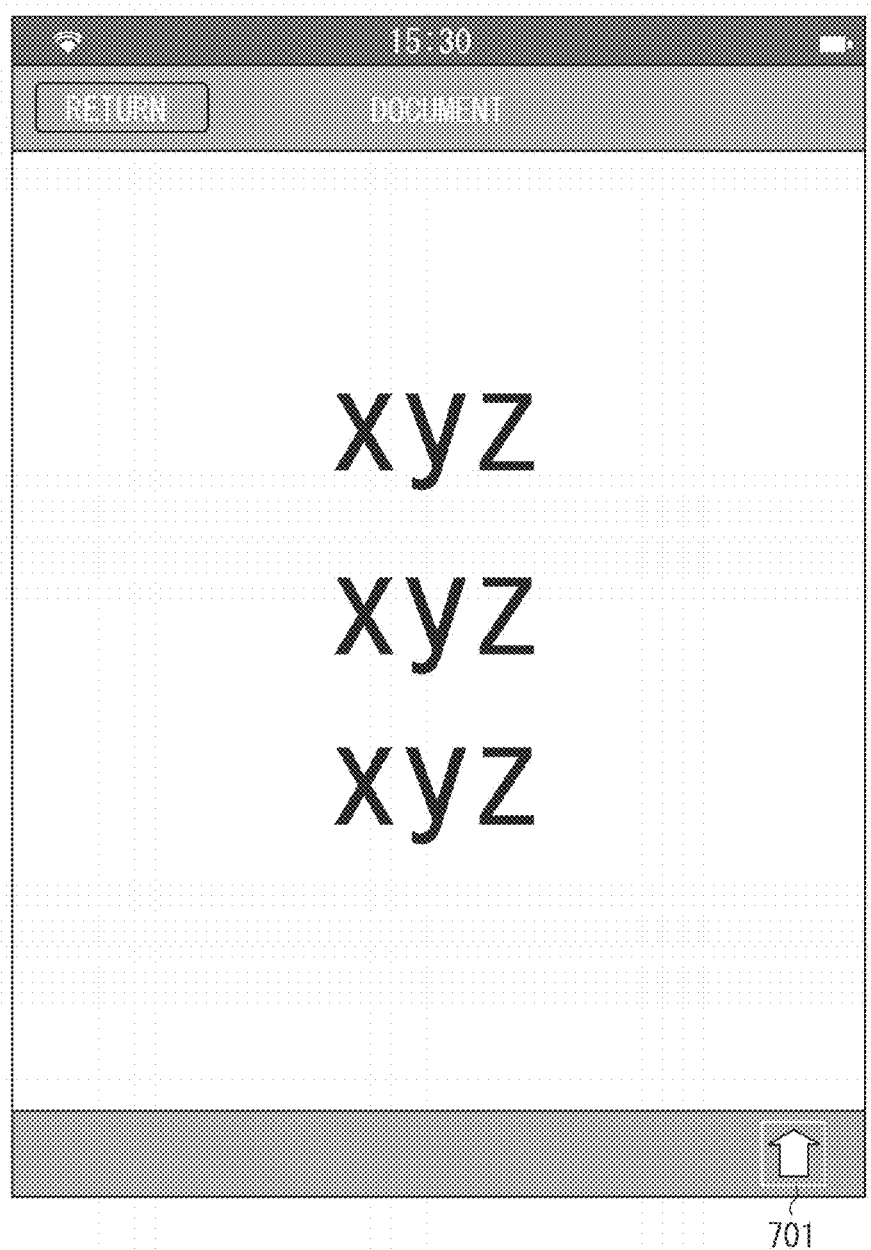
FIG. 7 is a diagram illustrating an example of an operation screen (2) of the tablet-type terminal.

FIG. 7 is a diagram illustrating an example of an operation screen of a data management application displayed on the tablet-type terminal 101. The tablet-type terminal 101 stores image data downloaded from a network and image data captured by using a camera function included in the tablet-type terminal 101. These pieces of image data can be switched and displayed one by one using the data management application installed on the tablet-type terminal 101. FIG. 7 illustrates an operation screen displaying one piece of stored image data.

In the operation screen illustrated in FIG. 7, when the user presses an operation key 701, the tablet-type terminal 101 displays a screen for selecting a function to be executed for the currently displayed image data. This screen displays the above-described fax transmission application in addition to a mail transmission application, and a printing application as selection candidates. When the user selects the fax transmission application, the screen changes to an operation screen illustrated in FIG. 8.

Figure 8:
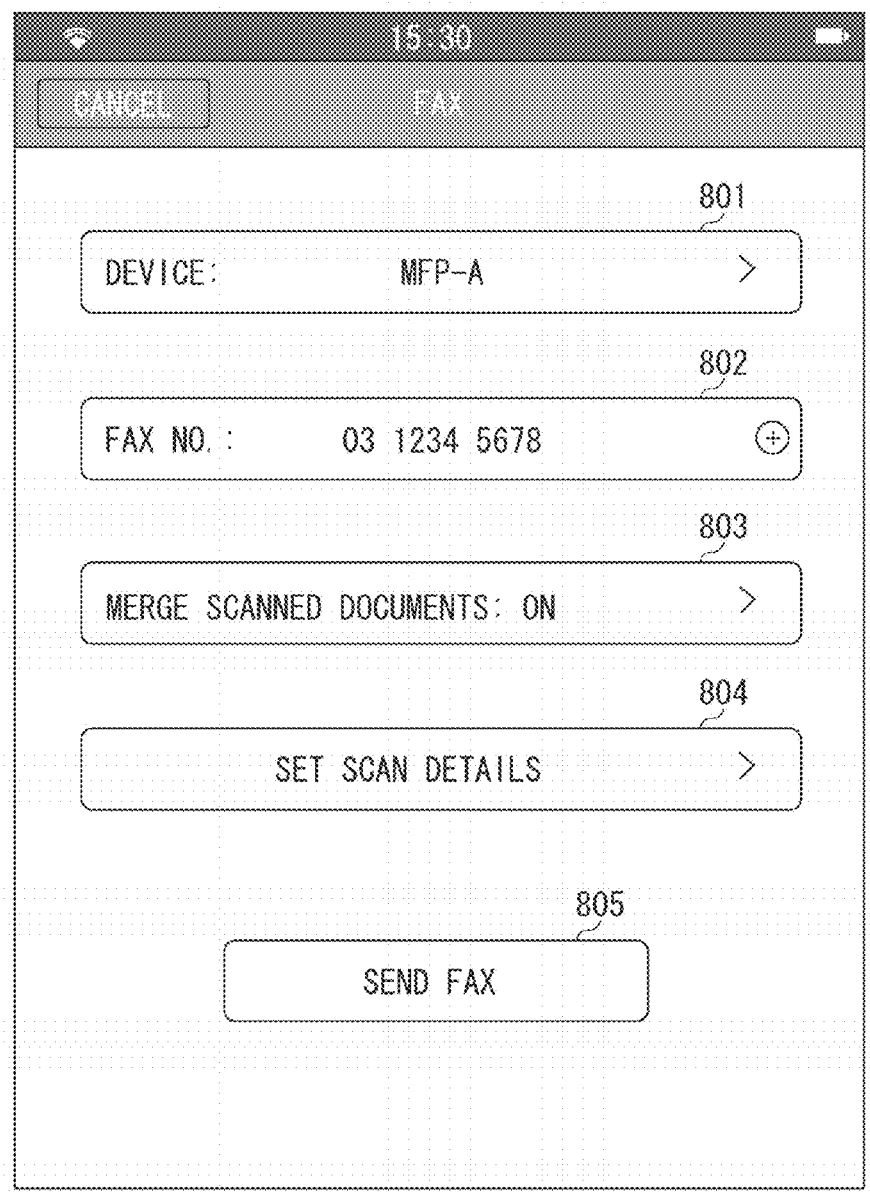
FIG. 8 is a diagram illustrating an example of an operation screen (3) of the tablet-type terminal.

FIG. 8 is a diagram illustrating an example of an operation screen of the fax transmission application displayed on the tablet-type terminal 101. Setting fields 801, 802, and 804 are similar to the setting fields 501, 502, and 503, respectively, described with reference to FIG. 5. A send fax key 805 is similar to the send fax key 504 described with reference to FIG. 5. When compared with the operation screen illustrated in FIG. 5, a setting field 803 is added to the operation screen illustrated in FIG. 8. The setting field 803 is used to specify whether only the image data selected on the operation screen illustrated in FIG. 7 is to be transmitted via fax from the MFP 103 or whether both the image data selected on the operation screen illustrated in FIG. 7 and the image data acquired through scan processing on the MFP 103 are to be transmitted via fax from the MFP 103. Hereinafter, the former processing is referred to as second transmission processing, and the latter processing is referred to as third transmission processing. "ON" or "OFF" can be selected in the setting field 803. When "OFF" is selected, the second transmission processing will be performed. When "ON" is selected, the third transmission processing will be performed. More specifically, the user is able to set whether merge processing is to be performed via the operation screen illustrated in FIG. 8. Then, the MFP 103 accepts an instruction indicating whether to perform the merge processing from the tablet-type terminal 101 (acceptance processing). The merge processing will be described in detail below.

FIG. 9 is a sequence diagram illustrating an example of processing to be performed when "OFF" is selected in the setting field 803, i.e., processing for performing the second transmission processing. In step S901, the tablet-type terminal 101 accepts an image selection from the user via an operation screen illustrated in FIG. 7. In step S902, the tablet-type terminal 101 accepts settings from the user via an operation screen illustrated in FIG. 8. In the second transmission processing, since the MFP 103 does not perform scan processing, the setting field 804 may be displayed in gray. In step S903, the tablet-type terminal 101 transmits a command for generating a job to the MFP 103. Upon reception of the command, then in step S904, the MFP 103 transmits a response (OK) to the tablet-type terminal 101.

In step S905, the tablet-type terminal 101 transmits an image command to the MFP 103. The image command contains image data to be transmitted via fax from the MFP 103. This image data is displayed on the operation screen illustrated in FIG. 7. Upon reception of an image command, then in step S906, the MFP 103 transmits a response (OK) to the tablet-type terminal 101. In step S907, the tablet-type terminal 101 transmits a command for ending the job to the MFP 103. Upon reception of the command, then in step S908, the MFP 103 transmits a response (OK) to the tablet-type terminal 101. In step S909, the MFP 103 transmits via fax the image data received from the tablet-type terminal 101. The destination of this fax transmission is the telephone number set in the setting field 802. In the second transmission processing, the MFP 103 does not perform scan processing. Therefore, unlike the first transmission processing, it is not necessary to wait for a user operation on the MFP 103.

As described above, according to the contents set on the tablet-type terminal 101, the MFP 103 transmits via fax the image data transmitted from the tablet-type terminal 101 to the MFP 103 (second transmission processing). The third transmission processing will be described below.

FIG. 10 is a sequence diagram illustrating an example of processing to be performed when the send fax key 805 illustrated in FIG. 8 is pressed in a state where "ON" is selected in the setting field 803, i.e., processing for performing the third transmission processing. In step S1001, the tablet-type terminal 101 accepts an image selection from the user via the operation screen illustrated in FIG. 7. In step S1002, the tablet-type terminal 101 accepts settings from the user via the operation screen illustrated in FIG. 8. In step S1003, the tablet-type terminal 101 transmits a command for generating a job to the MFP 103. Upon reception of the command, then in step S1004, the MFP 103 transmits a response (OK) to the tablet-type terminal 101.

In step S1005, the tablet-type terminal 101 transmits an image command to the MFP 103. The image command contains image data to be transmitted via fax from the MFP 103. This image data is displayed on the operation screen illustrated in FIG. 7. Upon reception of the image data, then in step S1006, the MFP 103 transmits a response (OK) to the tablet-type terminal 101. In step S1007, the tablet-type terminal 101 transmits a scan command for instructing the MFP 103 to perform scan processing. Upon reception of the command, then in step S1008, the MFP 103 transmits a response (OK) to the tablet-type terminal 101 regardless of the use state of the scanner 222. In step S1009, the tablet-type terminal 101 transmits a command for ending the job to the MFP 103. Upon reception of the command, then in step S1010, the MFP 103 transmits a response (OK) to the tablet-type terminal 101. In step S1011, the MFP 103 stores the received job as a waiting-for-document-scan fax transmission job.

Then, the MFP 103 waits for a user operation. In steps S1012 to S1017, the MFP 103 accepts a job selection and a read setting instruction through a user operation, and displays the transmission settings confirmation screen related to the selected job. Operations in these steps are similar to operations in steps S609 to S614 illustrated in FIG. 6, and descriptions thereof will be omitted.

In the third transmission processing, the MFP 103 is able to display a preview of the image data received from the tablet-type terminal 101 through the image command in step S1005, in addition to the transmission setting contents containing destination telephone numbers, in the transmission settings confirmation screen displayed in step S1017. In step S1018, the MFP 103 accepts a preview instruction from the user. Upon acceptance of the preview instruction, then in step S1019, the MFP 103 displays a preview of the image data on the display unit of the operation unit 220.

In step S1020, the MFP 103 accepts a user instruction indicating that the transmission setting contents are correct from the user. Upon acceptance of the instruction, then in step S1021, the MFP 103 displays the scan setting screen related to the job on the display unit of the operation unit 220, and accepts a user instruction. In step S1022, the MFP 103 accepts an instruction for performing scan processing from the user. Upon acceptance of the instruction, then in step S1023, the MFP 103 performs processing for scanning a document using the scanner 222. Although scan processing is performed according to the contents set in the setting field 803 illustrated in FIG. 8, when the setting contents are changed on the scan setting screen displayed in step S1021, the processing will be performed according to the settings after change.

In step S1024, the MFP 103 performs processing for merging the image data received through the image command in step S1005 and the image data acquired through the scan processing performed in step S1023. Merging refers to combining a plurality of pieces of image data into one piece of image data composed of a plurality of pages (the resultant data may be referred to as a document or a document file). In step S1025, the MFP 103 transmits via fax the resultant image data of the merging in step S1024. The destination of this fax transmission is the telephone number set in the setting field 802 illustrated in FIG. 8.

As described above, according to the contents set on the tablet-type terminal 101, the MFP 103 merges the image data transmitted from the tablet-type terminal 101 to the MFP 103 and the image data acquired through scan processing on the MFP 103, and then transmits via fax the resultant image data from the MFP 103. The third transmission processing is used, for example, when the user wants to transmit via fax a covering letter page generated on the tablet-type terminal 101 and image data acquired by scanning a document on the MFP 103 in a single communication operation. More specifically, the third transmission processing enables remarkably reducing time and effort for collectively transmitting image data generated on the tablet-type terminal 101 and image data generated on the MFP 103.

FIG. 11 is a flowchart illustrating an example of a job reception operation by the MFP 103 according to the present exemplary embodiment. Each operation (processing in each step) illustrated in the flowchart of FIG. 11 is implemented when the CPU 211 of the control unit 210 executes a control program stored in the ROM 212.

In step S1101, the job controller unit 302 receives a fax transmission job from the tablet-type terminal 101 through the sequences described in steps S602 to S607 illustrated in FIG. 6, steps S903 to S908 illustrated in FIG. 9, and steps S1003 to S1010 illustrated in FIG. 10. In step S1102, the job controller unit 302 determines the contents of the instruction received from the tablet-type terminal 101. More specifically, when an image command has been received and a scan command has not been received, the job controller unit 302 determines that a fax transmission of only the image data transmitted from the tablet-type terminal 101 (second transmission processing) has been instructed (YES in step S1102), and the processing proceeds to step S1103. Then, in step S1103, the fax unit 305 transmits via fax the image data transmitted from the tablet-type terminal 101, and the processing ends.

On the other hand, when a scan command has been received, the job controller unit 302 determines that a fax transmission of the image data acquired through scan processing on the MFP 103 (the first or the third transmission processing) has been instructed (NO in step S1102), and the processing proceeds to step S1104. Then, in step S1104, the job controller unit 302 stores the fax transmission job as a waiting-for-document-scan fax transmission job, and the processing ends.

FIG. 12, consisting of FIGS. 12A and 12B, is a flowchart illustrating an example of an execution flow relating to the waiting-for-document-scan fax transmission job stored in the MFP 103 in step S1104 of FIG. 11. Each operation (processing in each step) illustrated in the flowchart of FIG. 12 is implemented when the CPU 211 of the control unit 210 executes a control program stored in the ROM 212 similar to the flowchart illustrated in FIG. 11.

In step S1201, the job controller unit 302 waits for an instruction for displaying a list of waiting-for-document-scan fax transmission jobs from the user. When the job controller unit 302 accepts an instruction for displaying a list of waiting-for-document-scan fax transmission jobs from the user (YES in step S1201), the processing proceeds to step S1202. Then, in step S1202, the job controller unit 302 determines whether there is a waiting-for-document-scan fax transmission job. When there is a waiting-for-document-scan fax transmission job (YES in step S1202), the processing proceeds to step S1203. On the other hand, when there is no waiting-for-document-scan fax transmission job (NO in step S1202), then in step S1214, the UI unit 301 displays that there is no waiting-for-document-scan fax transmission job on the display unit of the operation unit 220, and the processing ends.

In step S1203, the UI unit 301 displays a screen for displaying a list of waiting-for-document-scan fax transmission jobs on the display unit of the operation unit 220. FIG. 13A illustrates an example of a screen displaying a list of waiting-for-document-scan fax transmission jobs. In the screen illustrated in FIG. 13A, the user is also able to narrow down the job list using the user name as a key. A user name is selected on a user selection screen (not illustrated) displayed when the user presses a button 1301. FIG. 13B illustrates an example of the user selection screen to which the result of the narrowing-down is reflected. The user selects an arbitrary job and presses a read setting button (button 1302) on the display screen illustrated in FIG. 13A or 13B, the user instructs the MFP 103 to start document scan processing related to the selected job.

Figure 13C:
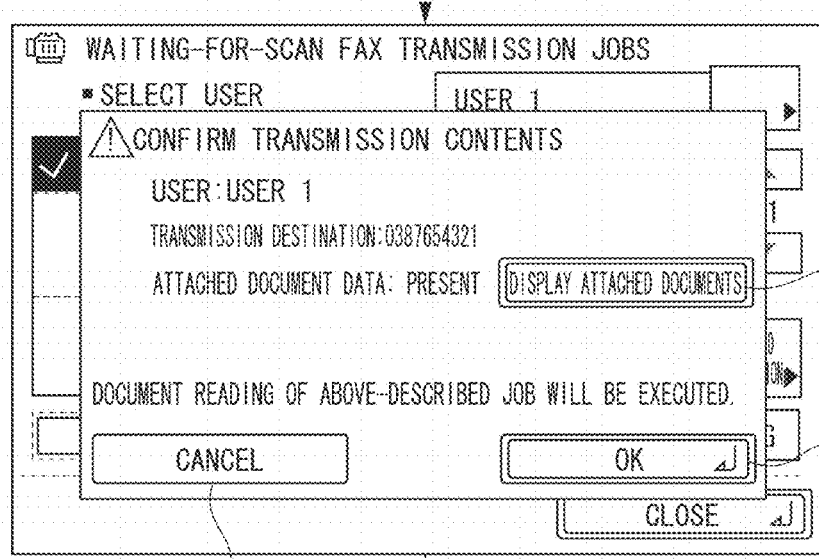
FIG. 13, consisting of FIGS. 13A to 13F, includes diagrams illustrating examples of display screens (1) on the MFP.
Figure 13E:
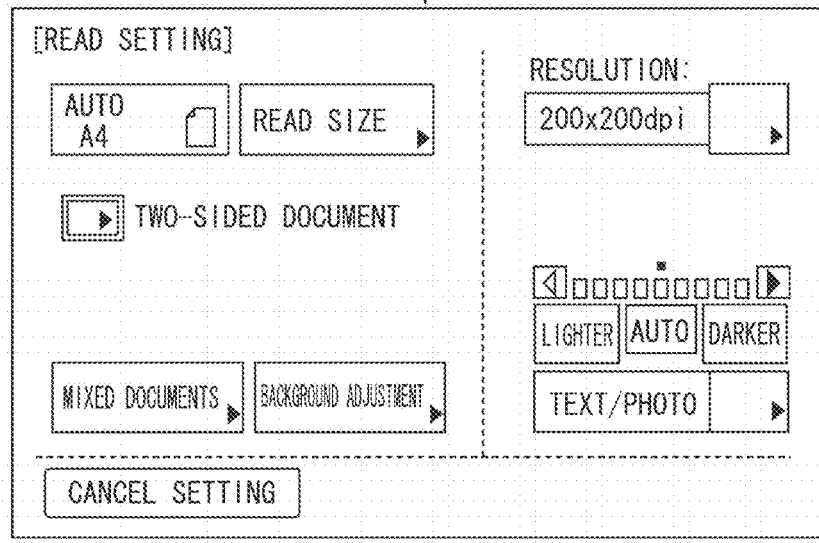
Figure 13D:
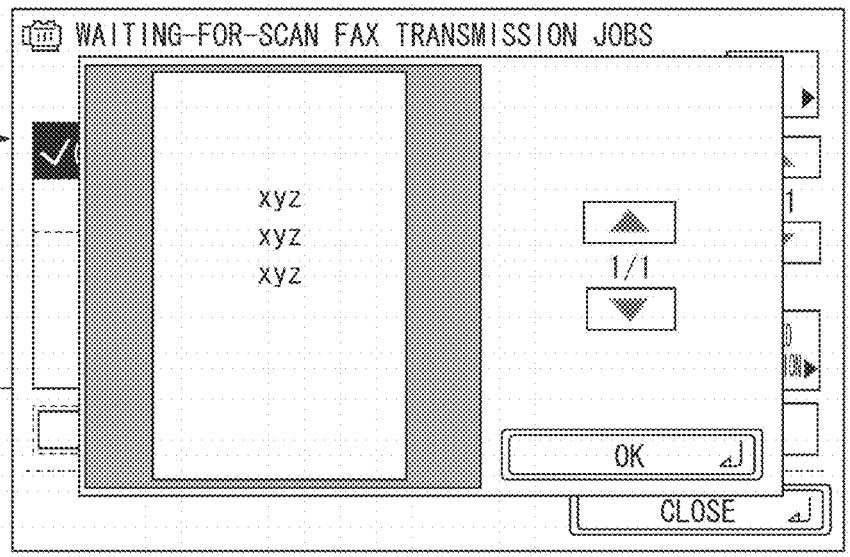

In step S1204, the job controller unit 302 waits for an instruction for starting document scan processing from the user. Upon acceptance of an instruction for starting document scan processing from the user (YES in step S1204), then in step S1205, the UI unit 301 displays a screen for confirming the transmission setting contents related to the job. FIG. 13C illustrates an example of the transmission settings confirmation screen. The screen illustrated in FIG. 13C displays the transmission setting contents containing at least a destination telephone number. When the job relates to the third transmission processing, the user is also able to display a preview of the image data received from the tablet-type terminal 101 on the display unit of the operation unit 220 by pressing a button 1303. This enables the user to confirm the image data received from the tablet-type terminal 101 before executing a job, thus improving user-friendliness. FIG. 13D illustrates an example of a preview display screen. On the display screen illustrated in FIG. 13C, the user inputs to the MFP 103 a transmission settings confirmation instruction (instruction indicating whether the transmission setting contents are correct). When the user inputs to the MFP 103 an instruction indicating that the transmission setting contents are correct, the user presses a button 1304. On the other hand, when the transmission setting contents are not correct, the user presses a button 1305.

In step S1206, the UI unit 301 waits for the transmission settings confirmation instruction from the user. Upon acceptance of the transmission settings confirmation instruction from the user (YES in step S1206), then in step S1207, the UI unit 301 determines the contents of transmission settings confirmation instruction from the user. Upon acceptance of an instruction indicating that the transmission setting contents are correct (YES in step S1207), the processing proceeds to step S1208. On the other hand, when the UI unit does not receive the instruction (NO in step S1207), the processing returns to step S1203. Then, in step S1203, the UI unit 301 redisplays the screen displaying a list of waiting-for-document-scan jobs.

Figure 13F:
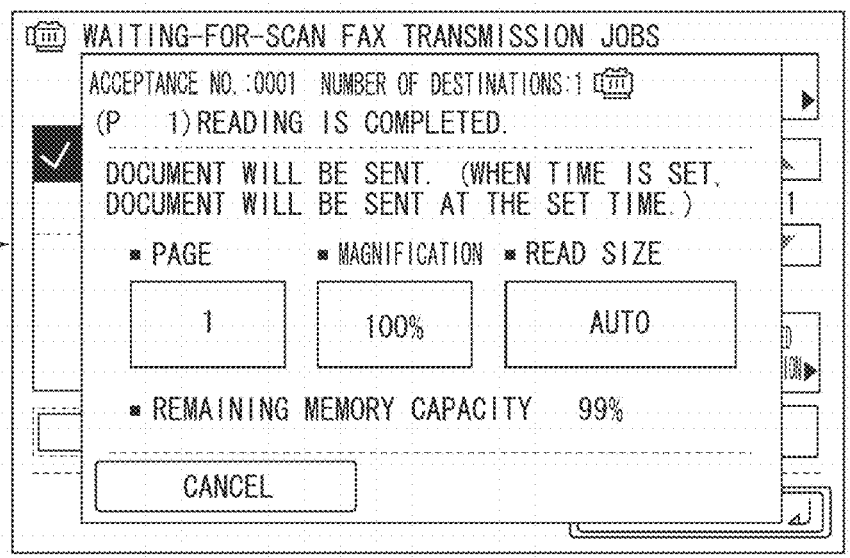

In step S1208, the UI unit 301 displays the scan setting screen on the display unit of the operation unit 220. FIG. 13E illustrates an example of the scan setting screen. On the display screen illustrated in FIG. 13E, the user is able to set details about scan processing performed by the MFP 103. In a state where the screen illustrated in FIG. 13E is displayed, the user is able to instructs the MFP 103 to perform scan processing by pressing a start key (not illustrated) on the operation unit 220. In step S1209, the UI unit 301 waits for an instruction for performing scan processing from the user. Upon acceptance of an instruction for performing scan processing from the user (YES in step S1209), then in step S1210, the scan unit 306 operates the scanner 222 to read a document to generate image data. FIG. 13F illustrates an example of a display screen during execution of scan processing.

In step S1211, the job controller unit 302 determines whether an image command has been received for the job, i.e., whether the third transmission processing is specified. When an image command has been received (YES in step S1211), the processing proceeds to step S1212. On the other hand, when an image command has not been received (NO in step S1211), the processing proceeds to step S1213. In step S1212, the job controller unit 302 performs processing for merging the received image data and the image data acquired through scan processing. In step S1213, the fax unit 305 performs fax transmission.

As described above, according to the present exemplary embodiment, when a fax transmission of the image data acquired through scan processing on the MFP 103 (the first and the third transmission processing) has been instructed, the MFP 103 stores the relevant instruction as a waiting-for-document-scan fax transmission job, and waits for a user operation before starting scan processing, regardless of the use state of the scanner 222. Upon acceptance of the user operation, the MFP 103 displays a screen for displaying a list of unprocessed waiting-for-document-scan fax transmission jobs, and accepts an instruction related to a user's job selection from the relevant list. Upon acceptance of the instruction related to a user's job selection, the MFP 103 displays the transmission settings confirmation screen related to the relevant job, and accepts a transmission settings confirmation instruction. Upon acceptance of an instruction indicating that the transmission setting contents are correct from the user, the MFP 103 performs scan processing and fax transmission related to the job.

Even in a case where a plurality of users uses the image processing apparatus on a shared basis, the above-described processing enables reliably executing a document reading-and-transmission job regardless of use states of the image processing system by other users, and preventing erroneous transmission of documents when a plurality of jobs is almost simultaneously entered.

A second exemplary embodiment of the present invention will be described below. In the first exemplary embodiment, when performing the first and the third transmission processing, the MFP 103 displays a screen for displaying a list of waiting-for-document-scan fax transmission jobs on the display unit of the operation unit 220 of the MFP 103. Then, upon reception of a job selection instruction and a transmission settings confirmation instruction by the user, the MFP 103 determines a job to be executed from among stored waiting-for-document-scan fax transmission jobs. The second exemplary embodiment differs from the first exemplary embodiment in that a job to be executed is determined by using an identification code (hereinafter referred to as a tag code) for uniquely identifying a job. A tag code is an example of identification information for enabling uniquely identifying a job. The present exemplary embodiment will be described below using the first transmission processing as an example.

FIG. 14 is a diagram illustrating an example of an operation screen of the fax transmission application displayed on the tablet-type terminal 101. Setting fields 1401, 1402, and 1404 are similar to the setting fields 501, 502, and 503, respectively, described with reference to FIG. 5 according to the first exemplary embodiment. A send fax key 1405 is similar to the send fax key 504 described with reference to FIG. 5. When compared with the operation screen illustrated in FIG. 5, a setting field 1403 is added to the operation screen illustrated in FIG. 14. The setting field 1403 is used to set a tag code for identifying a job. When the user presses the send fax key 1405 after setting the setting fields 1401 to 1404, communication between the tablet-type terminal 101 and the MFP 103 is started.

Figure 15:
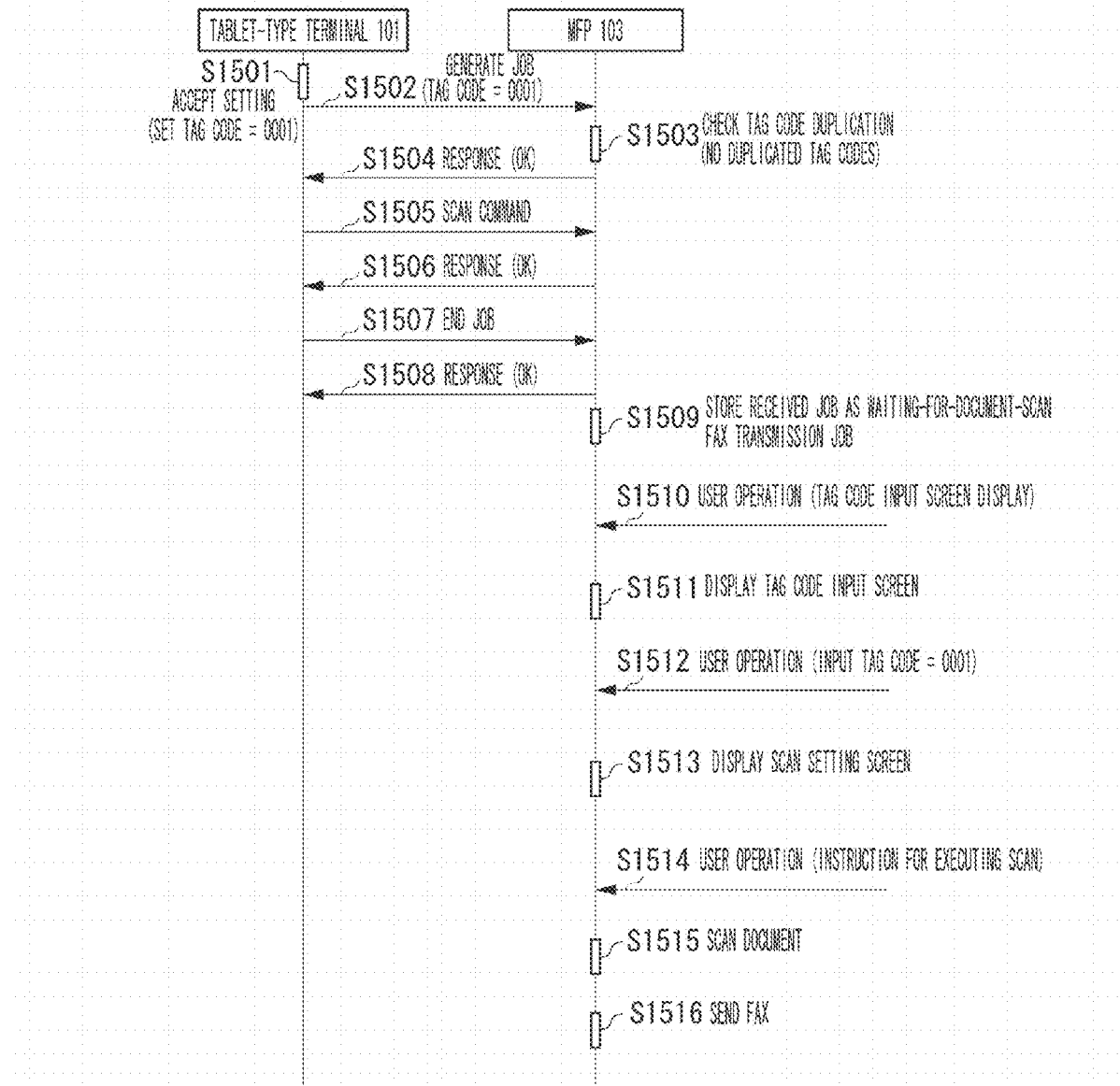
FIG. 15 is a sequence diagram (4) illustrating an example of processing of the image processing system.

FIG. 15 is a sequence diagram illustrating an example of processing performed between the tablet-type terminal 101 and the MFP 103 according to the present exemplary embodiment. In step S1501, the tablet-type terminal 101 accepts settings from the user via an operation screen illustrated in FIG. 14. In this example, a tag code "0001" is to be set in the setting field 1403. In step S1502, the tablet-type terminal 101 transmits a command for generating a job to the MFP 103. The tag code "0001" set in the setting field 1403 is to be added to a job generation command as attribute information. Upon reception of the command, then in step S1503, the MFP 103 checks whether there is a stored waiting-for-document-scan fax transmission job having a tag code setting duplicated with the tag code added to the relevant command. When there is no job having a duplicated tag code setting, the MFP 103 transmits a response (OK) to the tablet-type terminal 101. On the other hand, when there is a job having a duplicated tag code setting, the MFP 103 transmits a response (NG) thereto. This example assumes that there is no job having a duplicated tag code setting.

In step S1504, the MFP 103 transmits a response (OK) to the tablet-type terminal 101. In step S1505, the tablet-type terminal 101 transmits a scan command for instructing the MFP 103 to perform scan processing. Upon reception of the command, then in step S1506, the MFP 103 transmits a response (OK) to the tablet-type terminal 101 regardless of the use state of the scanner 222. In step S1507, the tablet-type terminal 101 transmits a command for ending the job to the MFP 103. Upon reception of the relevant command, then in step S1508, the MFP 103 transmits a response (OK) to the tablet-type terminal 101. In step S1509, the MFP 103 stores the received job as a waiting-for-document-scan fax transmission job. More specifically, the MFP 103 stores the received job in an identifiable way using a tag code.

In step S1510, the MFP 103 waits for a user operation. Upon acceptance of a user operation (an instruction for displaying a tag code input screen), the processing proceeds to step S1511. Then, in step S1511, the MFP 103 displays the tag code input screen on the display unit of the operation unit 220. In step S1512, the MFP 103 accepts a tag code input from the user. Upon acceptance of a tag code input from the user, then in step S1513, the MFP 103 displays the scan setting screen related to a waiting-for-document-scan fax transmission job having a tag code matching the input tag code, and accepts a user instruction.

In step S1514, the MFP 103 accepts an instruction for performing scan processing from the user. Upon acceptance of the relevant instruction, then in step S1515, the MFP 103 performs processing for scanning a document using the scanner 222. Although scan processing is performed according to the setting contents set in the setting field 1404 illustrated in FIG. 14, when the setting contents are changed on the scan setting screen displayed in step S1513, the processing is to be performed according to the settings after change. In step S1516, the MFP 103 transmits via fax the image data acquired through the scan processing performed in step S1515. The destination of this fax transmission is the telephone number set in the setting field 1402 illustrated in FIG. 14.

Figure 16:
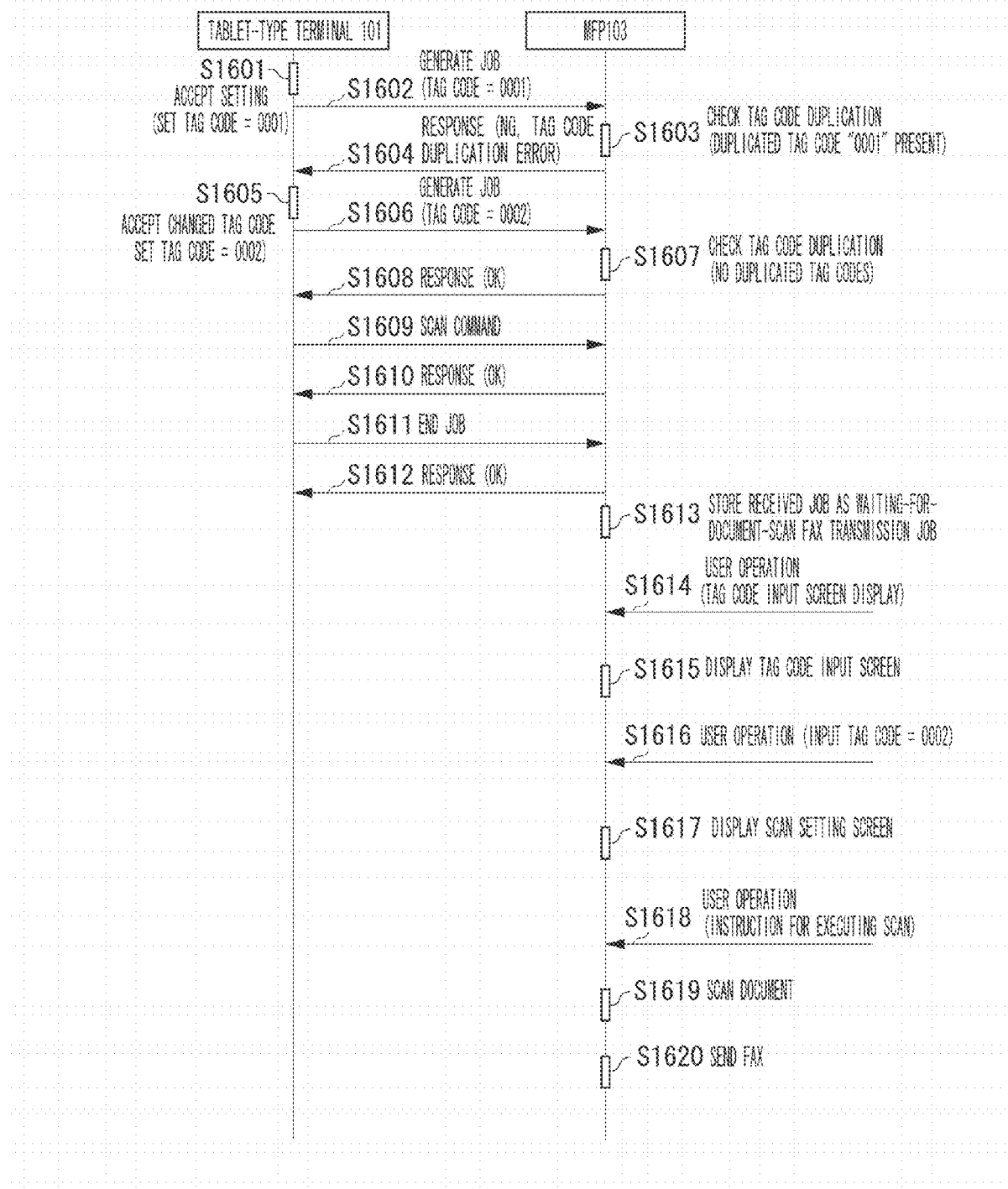
FIG. 16 is a sequence diagram (5) illustrating an example of processing of the image processing system.

In the example illustrated in FIG. 15, when the MFP 103 receives a job generation command from the tablet-type terminal 101, there is no waiting-for-document-scan fax transmission job having a tag code duplicated with the tag code added to the above-described job generation command. FIG. 16 illustrates an example of a case where there is a waiting-for-document-scan fax transmission job having a duplicated tab code. FIG. 16 is a sequence diagram illustrating an example of processing performed between the tablet-type terminal 101 and the MFP 103 when there is a waiting-for-document-scan fax transmission job having a duplicated tab code. In step S1601, the tablet-type terminal 101 accepts settings from the user via the operation screen illustrated in FIG. 14. In this example, "0001" is to be set as a tag code in the setting field 1403. In step S1602, the tablet-type terminal 101 transmits a command for generating a job to the MFP 103. The tag code "0001" set in the setting field 1403 is to be added to a job generation command as attribute information. Upon reception of the command, then in step S1603, the MFP 103 checks whether there is a stored waiting-for-document-scan fax transmission job having a tag code setting duplicated with the tag code added to the relevant command. As an example, a case where there is a job having a duplicated tag code setting "0001" will be described below. In step S1604, the MFP 103 transmits a response (NG, i.e., a tag code duplication error) to the tablet-type terminal 101. This enables preventing tag code duplication. The processing in step S1604 is an example of notification processing for notifying the user of a tag code duplication error.

In step S1605, the tablet-type terminal 101 displays a message indicating the occurrence of a tag code duplication error on the display unit of the operation unit 420, and prompts the user to change the tag code. In step S1605, the tablet-type terminal 101 redisplays the operation screen illustrated in FIG. 14, and accepts an operation for changing the tag code from the user. In this example, a tag code "0002" is to be set as a changed tag code in the setting field 1403. In step S1606, the tablet-type terminal 101 transmits a command for generating a job to the MFP 103. The changed tag code "0002" is to be added to the job generation command as attribute information. Upon reception of the command, then in step S1607, the MFP 103 checks whether there is a stored waiting-for-document-scan fax transmission job having a tag code setting duplicated with the tag code "0002" added to the command. In this example, it is assumed that there is no job having a tag code setting duplicated with the changed tag code "0002".

In step S1608, the MFP 103 transmits a response (OK) to the tablet-type terminal 101. In step S1609, the tablet-type terminal 101 transmits a scan command for instructing the MFP 103 to perform scan processing. Upon reception of the command, then in step S1610, the MFP 103 transmits a response (OK) to the tablet-type terminal 101 regardless of the use state of the scanner 222. In step S1611, the tablet-type terminal 101 transmits a command for ending the job to the MFP 103. Upon reception of the command, then in step S1612, the MFP 103 transmits a response (OK) to the tablet-type terminal 101. In step S1613, the MFP 103 stores the received job as a waiting-for-document-scan fax transmission job.

The sequence in steps S1614 to S1620 is similar to the sequence in steps S1510 to step S1516 illustrated in FIG. 15 except that the changed tag code "0002" is input in step S1616, and descriptions thereof will omitted.

Figure 17:
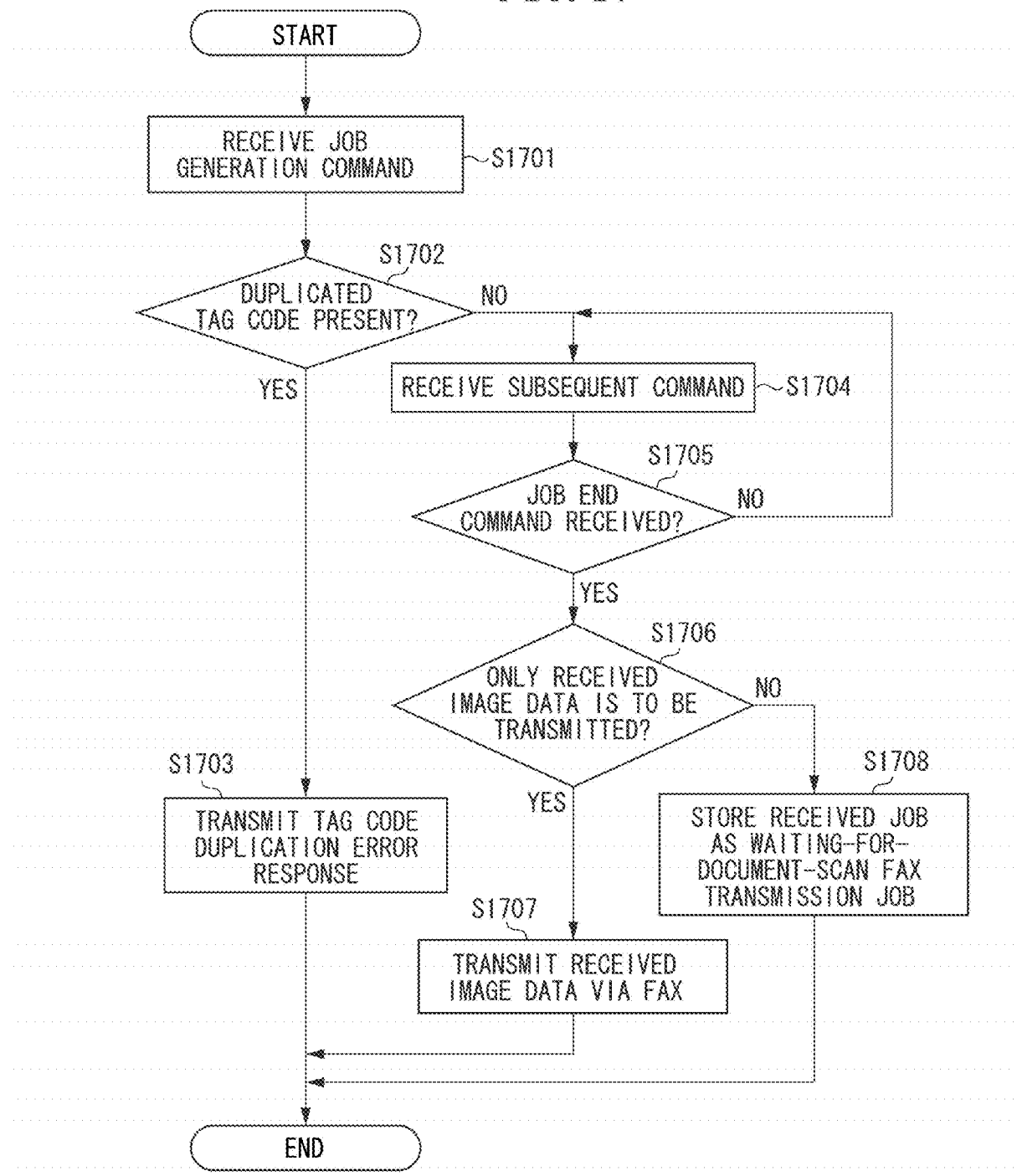
FIG. 17 is a flowchart (3) illustrating an example of processing of the MFP.

FIG. 17 is a flowchart illustrating an example of a job reception operation on the MFP 103 according to the second exemplary embodiment. Each operation (processing in each step) illustrated in the flowchart of FIG. 17 is implemented when the CPU 211 of the control unit 210 executes a control program stored in the ROM 212.

In step S1701, the job controller unit 302 receives a job generation command from the tablet-type terminal 101. In step S1702, the job controller unit 302 determines whether there is a waiting-for-document-scan fax transmission job having a tag code duplicated with the tag code added to the job generation command. When there is a job having a duplicated tag code setting (YES in step S1702), the processing proceeds to step S1703. Then, in step S1703, the job controller unit 302 transmits a tag code duplication error as a response to the tablet-type terminal 101, and the processing ends. On the other hand, when there is no job having a duplicated tag code setting (NO in step S1702), the processing proceeds to step S1704. Then, in step S1704, the job controller unit 302 receives a subsequent command transmitted from the tablet-type terminal 101. When the job controller unit 302 receives a subsequent command, the processing proceeds to step S1705. Then, in step S1705, the job controller unit 302 determines whether a job end command has been received. When the job end command has been received (YES in step S1705), the processing proceeds to step S1706. On the other hand, when the job end command has not been received (NO in step S1705), the processing returns to step S1704. Then, in step S1704, the job controller unit 302 receives a subsequent command again.

In step S1706, the job controller unit 302 determines the contents of the instruction received from the tablet-type terminal 101. More specifically, when an image command has been received and a scan command has not, the job controller unit 302 determines the received instruction as an instruction for transmitting via fax only the image data transmitted from the tablet-type terminal 101. When the job controller unit 302 determines that the relevant instruction has been received (YES in step S1706), then in step S1707, the fax unit 305 transmits via fax the image data received through the image command, and the processing ends. On the other hand, when a scan command has been received (NO in step S1706), then in step S1708, the job controller unit 302 stores the relevant job as a waiting-for-document-scan fax transmission job.

Figure 18:
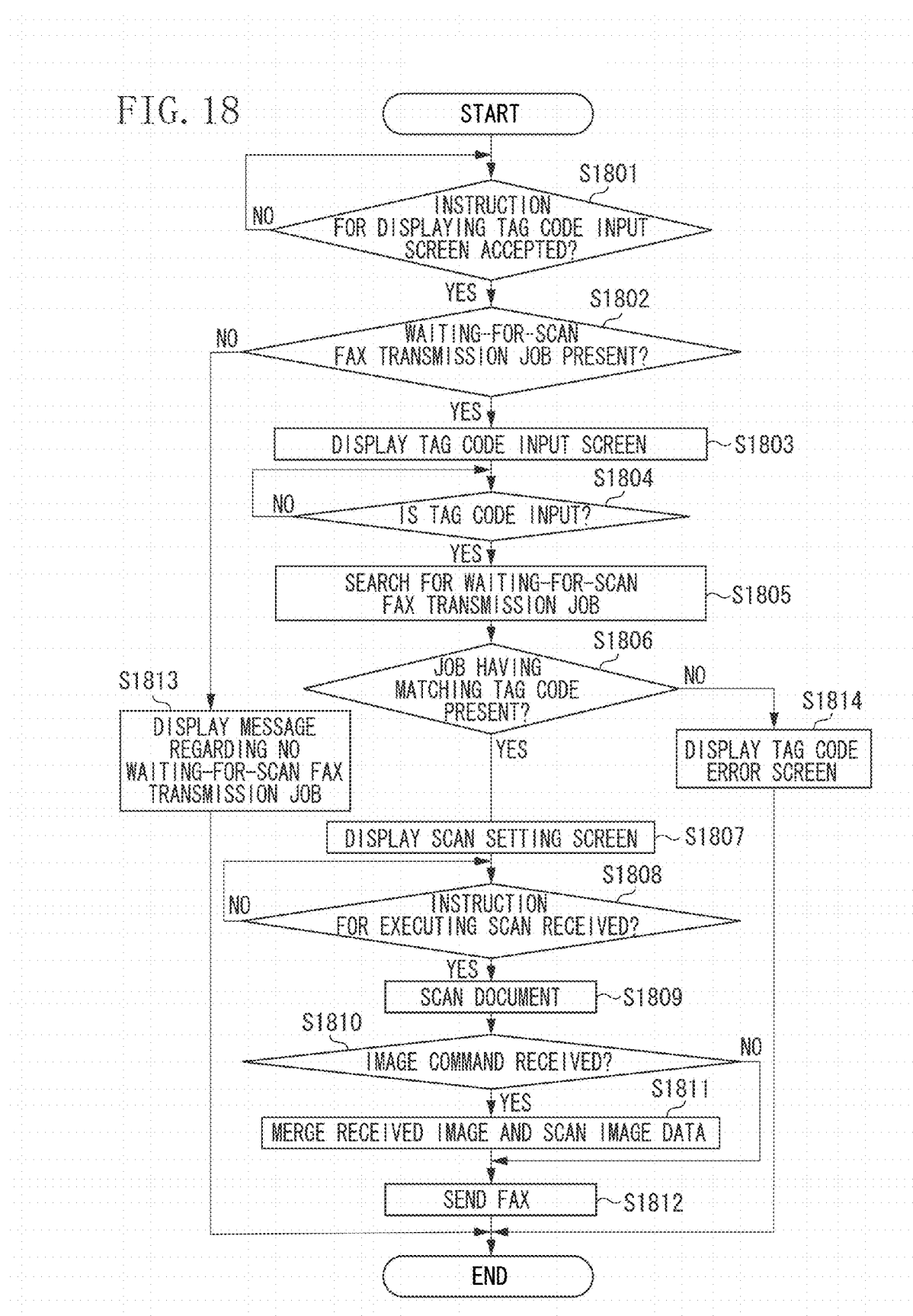
FIG. 18 is a flowchart (4) illustrating an example of processing of the MFP.

FIG. 18 is a flowchart illustrating an example of a flowchart related to a waiting-for-document-scan fax transmission job stored in the MFP 103 in step S1708 illustrated in FIG. 17. Each operation (processing in each step) illustrated in the flowchart of FIG. 18 is implemented when the CPU 211 of the control unit 210 executes a control program stored in the ROM 212 similar to the flowchart illustrated in FIG. 17.

In step S1801, the job controller unit 302 waits for an instruction for displaying the tag code input screen for inputting a tag code by the user. When the job controller unit 302 accepts an instruction for displaying the tag code input screen for inputting a tag code by the user (YES in step S1801), the processing proceeds to step S1802. Then in step S1802, the job controller unit 302 determines whether there is a waiting-for-document-scan fax transmission job. When there is a waiting-for-document-scan fax transmission job (YES in step S1802), the processing proceeds to step S1803. On the other hand, when there is no waiting-for-document-scan fax transmission job (NO in step S1802), then in step S1813, the UI unit 301 displays a message indicating that there is no waiting-for-document-scan fax transmission job on the display unit of the operation unit 220, and the processing ends. In step S1803, the UI unit 301 displays the tag code input screen on the display unit of the operation unit 220. FIG. 19A illustrates an example of the tag code input screen.

In step S1804, the job controller unit 302 waits for a tag code input from the user. When the job controller unit 302 accepts a tag code input from the user (YES in step S1804), the processing proceeds to step S1805. Then, in step S1805, the job controller unit 302 searches for a waiting-for-document-scan fax transmission job having a tag code setting matching the input tag code. In step S1806, the job controller unit 302 determines the result of the search. When there is a job having a matching tag code (YES in step S1806), the processing proceeds to step S1807. On the other hand, when there is no job having a matching tag code (NO in step S1806), the processing proceeds to step S1814.

Figure 19B:
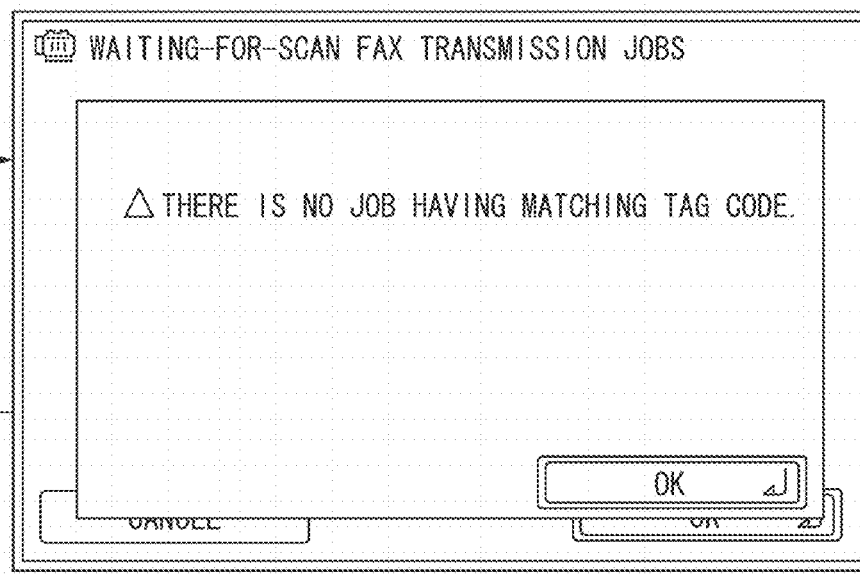
FIG. 19, consisting of FIGS. 19A to 19E, includes diagrams illustrating examples of display screens (2) on the MFP.
Figure 19D:
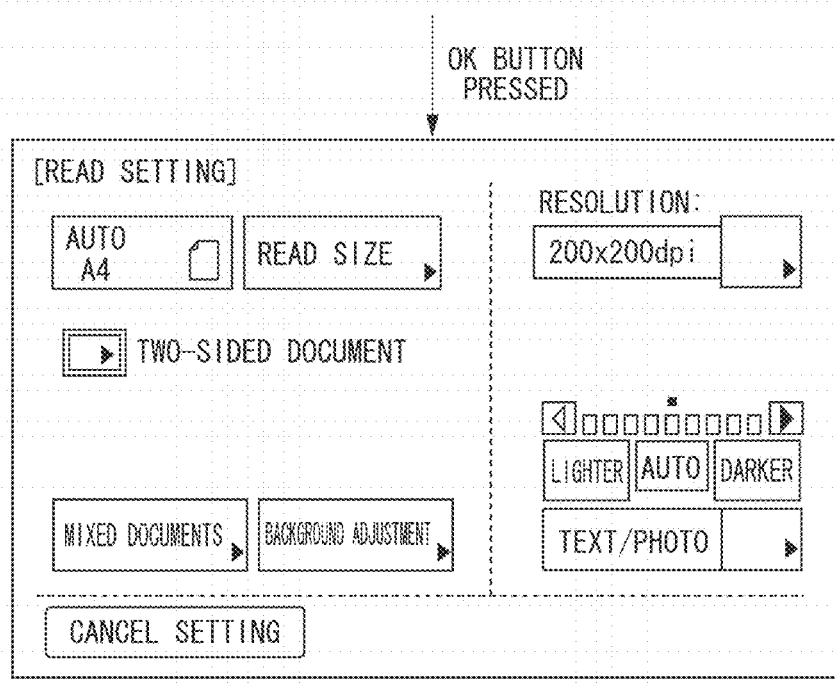
Figure 19E:
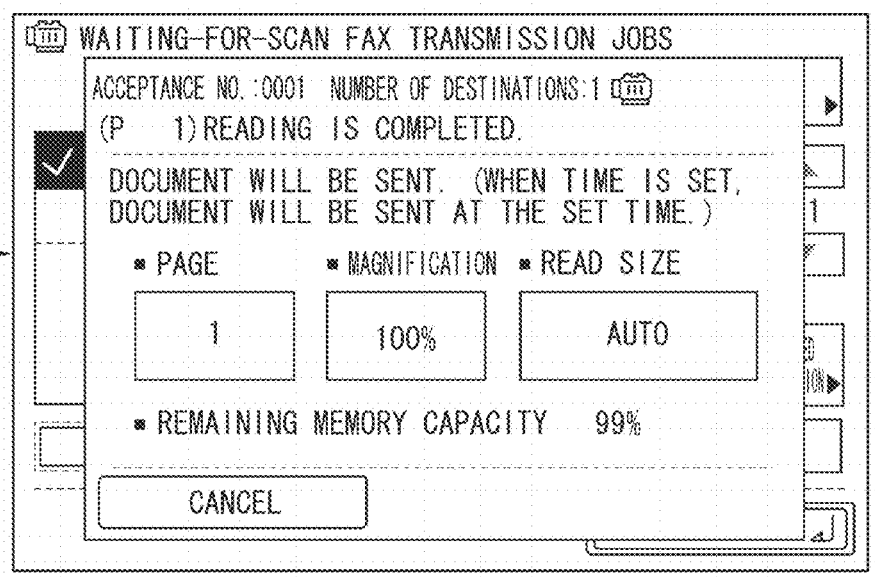

In step S1814, the UI unit 301 displays an error message indicating that there is no job having a tab code matching the input tag code on the display unit of the operation unit 220, and the processing ends. In step S1807, the UI unit 301 displays a message indicating that a job having a tag code matching the input tag code was found on the display unit of the operation unit 220, and then displays the scan setting screen related to the job. FIG. 19B illustrates an example of a display screen when there is no job having a matching tag code. FIG. 19C illustrates an example of a display screen when there is a job having a matching tag code. Since the processing performed in steps S1807 to S1812 illustrated in FIG. 18 is similar to the processing performed in steps S1208 to S1213 illustrated in FIG. 12, descriptions thereof will be omitted. Further, FIGS. 19D and 19E are similar to FIGS. 13E and 13F, respectively, descriptions thereof will be omitted.

As described above, in the second exemplary embodiment, when the tablet-type terminal 101 instructs the MFP 103 to transmit via fax the image data acquired through scan processing on the MFP 103 (the first and the third transmission processing), the tablet-type terminal 101 adds to a job a tag code input from the user on the tablet-type terminal 101, and enters the job to the MFP 103. Unless there is a waiting-for-document-scan fax transmission job having a duplicated tag code, the MFP 103 accepts the entered job, stores the job as a waiting-for-document-scan fax transmission job, and waits for a user operation before starting scan processing. Upon acceptance of the user operation, the MFP 103 displays the tag code input screen and accepts a tag code input from the user. Upon acceptance of a tag code input from the user, the MFP 103 searches for a job having a tag code matching the input tag code, and performs scan processing and fax transmission related to the job found as a result of the search. This configuration enables the user to specify a job to be executed, without any operation such as selecting a desired job from a list of waiting-for-document-scan fax transmission jobs and then performing scan processing, thus improving user-friendliness.

The present invention can also be achieved when a program for implementing one or more of the above-described functions is supplied to a system or apparatus via a network or storage medium, and one or more processors in a computer of the system or apparatus read and execute the program. The present invention can also be achieved by using a circuit (e.g., an ASIC) for implementing one or more of the above described functions.

According to the above-described exemplary embodiments, it is possible to provide a mechanism for reliably executing a document reading-and-transmission job regardless of use states of an image processing apparatus by other users even in a case where a plurality of users uses the image processing apparatus on a shared basis.

While the present invention has specifically been described in detail based on the above-described exemplary embodiments, the present invention is not limited thereto. Therefore, the exemplary embodiments can be modified in diverse ways within the scope of the appended claims.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-250976, filed Dec. 11, 2014, which is hereby incorporated by reference herein in its entirety.

What is claimed is:

1. An image processing apparatus for reading a document to generate image data using a scanner, the image processing apparatus comprising:
   a memory device that stores a set of instructions; and
   at least one processor configured to execute the instructions, the instructions comprising instructions for:
      receiving, from an information processing apparatus communicable via a network, a transmission job for transmitting image data to a specified destination;

determining whether the received transmission job is a transmission job that contains image data and does not contain an instruction for causing the scanner to read a document or not;

storing the received transmission job into a storage in a case where it is determined that the received transmission job is not a transmission job that contains image data and does not contain an instruction for causing the scanner to read a document;

executing the received transmission job in a case where it is determined that the received transmission job is a transmission job that contains image data and does not contain an instruction for causing the scanner to read a document;

displaying a list of jobs stored into the storage according to a user instruction;

displaying a confirmation screen related to a setting of a transmission job selected from the list of jobs; and executing the transmission job in accordance with execution of the selected transmission job instructed via the confirmation screen.

2. The image processing apparatus according to claim 1, wherein, in a case where the received transmission job contains image data and contains an instruction for causing the scanner to read a document, image data obtained by merging the image data generated by the scanner through execution of the selected transmission job and the image data contained in the transmission job is transmitted to the specified destination.

3. The image processing apparatus according to claim 2, the instructions further comprising instructions for:

accepting, from the information processing apparatus, an instruction indicating whether to merge the image data generated by the scanner and the image data contained in the transmission job, wherein, in a case where the instruction indicates to merge the image data generated by the scanner and the image data contained in the transmission job, the image data obtained by the merging is transmitted to the specified destination.

4. The image processing apparatus according to claim 1, the instructions further comprising instructions for:

displaying, in a case where the received transmission job contains image data, a preview of the image data according to a user operation.

5. The image processing apparatus according to claim 1, the instructions further comprising instructions for:

displaying a setting screen for accepting settings related to document reading to be executed by the scanner when the transmission job is executed in a case where execution of the selected transmission job is instructed via the confirmation screen, wherein executing the transmission job comprises executing the transmission job according to the settings accepted via the setting screen.

6. An image processing apparatus for reading a document to generate image data using a scanner, the image processing apparatus comprising:

a memory device that stores a set of instructions; and at least one processor configured to execute the instructions, the instructions comprising instructions for:

receiving, from an information processing apparatus communicable via a network, a transmission job for causing the scanner to read a document to generate image data and then transmit the image data to a specified destination, wherein information based on a pass code accepted from a user by using the information processing apparatus is set in the transmission job;

storing the received transmission job;

displaying an input screen for accepting an input of a pass code for identifying a transmission job that is to be executed; and executing the received transmission job in which information corresponding to the pass code input via the input screen is set on condition that the pass code input via the screen agrees with the pass code corresponding to the information.

7. The image processing apparatus according to claim 6, the instructions further comprising instructions for:

notifying a duplication error to the information processing apparatus in a case where the transmission job in which the same information as the information of the pass code set in the jobs stored in a storage is received.

8. An image processing method performed by an image processing apparatus for reading a document to generate image data using a scanner, the image processing method comprising:

receiving, from an information processing apparatus communicable via a network, a transmission job for transmitting image data to a specified destination;

determining whether the received transmission job is a transmission job that contains image data and does not contain an instruction for causing the scanner to read a document or not;

storing the received transmission job into a storage in a case where it is determined that the received transmission job is not a transmission job that contains image data and does not contain an instruction for causing the scanner to read a document;

executing the received transmission job in a case where it is determined that the received transmission job is a transmission job that contains image data and does not contain an instruction for causing the scanner to read a document;

displaying a list of jobs stored into the storage according to a user instruction;

displaying a confirmation screen related to a setting of a transmission job selected from the list of jobs; and executing the transmission job in accordance with execution of the selected transmission job instructed via the confirmation screen.

9. An image processing method performed by an image processing apparatus for reading a document to generate image data using a scanner, the image processing method comprising:

receiving, from an information processing apparatus communicable via a network, a transmission job for causing the scanner to read a document to generate image data and then transmit the image data to a specified destination, wherein information based on a pass code accepted from a user by using the information processing apparatus is set in the transmission job;

storing the received transmission job;

displaying an input screen for accepting an input of a pass code for identifying a transmission job that is to be executed; and executing the received transmission job in which information corresponding to the pass code input via the input screen is set on condition that the pass code input via the screen agrees with the pass code corresponding to the information.

10. A non-transitory computer-readable storage medium storing instructions that, when executed by a computer, cause the computer to perform a method comprising:
  receiving, from an information processing apparatus communicable via a network, a transmission job for transmitting image data to a specified destination;
  determining whether the received transmission job is a transmission job that contains image data and does not contain an instruction for causing a scanner to read a document or not;
  storing the received transmission job into a storage in a case where it is determined that the received transmission job is not a transmission job that contains image data and does not contain an instruction for causing the scanner to read a document;
  executing the received transmission job in a case where it is determined that the received transmission job is a transmission job that contains image data and does not contain an instruction for causing the scanner to read a document;
  displaying a list of jobs stored into the storage according to a user instruction;
  displaying a confirmation screen related to a setting of a transmission job selected from the list of jobs; and
  executing the transmission job in accordance with execution of the selected transmission job instructed via the confirmation screen.

11. A non-transitory computer-readable storage medium storing instructions that, when executed by a computer, cause the computer to perform a method comprising:
  receiving, from an information processing apparatus communicable via a network, a transmission job for causing a scanner to read a document to generate image data and then transmit the image data to a specified destination, wherein information based on a pass code accepted from a user by using the information processing apparatus is set in the transmission job;
  storing the received transmission job;
  displaying an input screen for accepting an input of a pass code for identifying a transmission job that is to be executed; and
  executing the received transmission job in which information corresponding to the pass code input via the input screen is set on condition that the pass code input via the screen agrees with the pass code corresponding to the information.

* * * * *